United States Patent
Cho

(10) Patent No.: US 10,727,951 B2
(45) Date of Patent: Jul. 28, 2020

(54) LOW-COMPLEXITY CONSTELLATION SHAPING

(71) Applicant: Alcatel-Lucent USA Inc., Murray Hill, NJ (US)

(72) Inventor: Joon Ho Cho, Holmdel, NJ (US)

(73) Assignee: NOKIA OF AMERICA CORPORATION, Murray Hill, NJ (US)

( * ) Notice: Subject to any disclaimer, the term of this patent is extended or adjusted under 35 U.S.C. 154(b) by 0 days.

(21) Appl. No.: 15/215,013

(22) Filed: Jul. 20, 2016

(65) Prior Publication Data

US 2018/0026725 A1 Jan. 25, 2018

(51) Int. Cl.
*H04B 10/564* (2013.01)
*H04L 27/34* (2006.01)
(Continued)

(52) U.S. Cl.
CPC ......... *H04B 10/564* (2013.01); *H04L 1/0042* (2013.01); *H04L 27/3411* (2013.01); *H04L 27/3427* (2013.01); *H04L 27/362* (2013.01)

(58) Field of Classification Search
CPC ........... H04L 25/4927; H04L 25/03343; H04L 27/34; H04L 1/0003; H04L 27/3411;
(Continued)

(56) References Cited

U.S. PATENT DOCUMENTS 5,216,694 A * 6/1993 Wei ................. H03M 13/25
                                                  375/264
5,442,626 A * 8/1995 Wei ................. H04J 7/00
                                                  329/304
(Continued)

OTHER PUBLICATIONS

Yousefi, Mansoor I., and Frank R. Kschischang. "Information transmission using the nonlinear Fourier transform, Part I-Part III" IEEE Transactions on Information Theory 60.7 (2014): 4312-4328.
(Continued)

*Primary Examiner* — James C Kerveros
(74) *Attorney, Agent, or Firm* — Mendelsohn Dunleavy, P.C.; Yuri Gruzdkov

(57) ABSTRACT

We disclose a transmitter that uses at least first and second fixed constellations in which the same bit-words are assigned to different respective constellation symbols of different respective transmit energies. The transmitter generates an outgoing data frame by first generating two data frames using the first and second constellations, respectively, and then selecting the one of the two data frames that has the lower overall transmit energy and discarding the other. The first and second constellations are constructed in a manner that enables the transmitter to realize a significant shaping gain. Some embodiments of the transmitter are compatible with the use of forward-error-correction coding and provide a shaping gain for the transmission of both information and parity bits. An example embodiment of the transmitter can advantageously be implemented with relatively low complexity by employing constellation mappers and demappers that operate using relatively small look-up tables.

22 Claims, 9 Drawing Sheets

(51) Int. Cl.
H04L 27/36 (2006.01)
H04L 1/00 (2006.01)

(58) Field of Classification Search
CPC . H04L 27/362; H04L 27/3427; H04L 1/0042; H03M 13/235; H04N 21/2383; H04B 10/564
USPC ......................................................... 714/776
See application file for complete search history.

(56) References Cited

U.S. PATENT DOCUMENTS

| | | | | |
|---|---|---|---|---|
| 5,659,579 | A * | 8/1997 | Herzberg | H03M 13/23 375/262 |
| 6,173,015 | B1 * | 1/2001 | Eyuboglu | H04L 25/03343 375/286 |
| 7,251,768 | B2 * | 7/2007 | Giannakis | H03M 13/29 375/262 |
| 7,957,482 | B2 * | 6/2011 | Golitschek Edler Von Elbwart | H04L 27/38 375/261 |
| 9,036,694 | B2 | 5/2015 | Zhou et al. | |
| 9,036,742 | B2 | 5/2015 | Butussi et al. | |
| 9,143,239 | B2 | 9/2015 | Yamazaki | |
| 9,143,377 | B2 * | 9/2015 | Sagi | H04L 27/06 |
| 9,698,939 | B2 | 7/2017 | Oveis Gharan et al. | |
| 9,780,990 | B2 * | 10/2017 | Zhang | H04L 27/367 |
| 2007/0011595 | A1 * | 1/2007 | Cameron | H03M 13/256 714/796 |
| 2009/0141791 | A1 | 6/2009 | Ungerboeck et al. | |
| 2011/0013683 | A1 * | 1/2011 | Cepeda Lopez | H04L 27/2614 375/224 |
| 2015/0295676 | A1 * | 10/2015 | Kenney | H04L 5/0023 370/330 |
| 2016/0087651 | A1 | 3/2016 | Lu | |
| 2016/0127166 | A1 * | 5/2016 | Zhang | H04L 27/367 398/185 |
| 2016/0173135 | A1 * | 6/2016 | Myung | H04L 1/0041 714/776 |
| 2016/0219506 | A1 * | 7/2016 | Pratt | H04W 52/0209 |
| 2016/0315704 | A1 * | 10/2016 | Djordjevic | H04L 1/0041 |
| 2019/0052511 | A1 * | 2/2019 | Gultekin | H04L 1/0042 |

OTHER PUBLICATIONS

Shevchenko, Nikita A., et al. "A lower bound on the per soliton capacity of the nonlinear optical fibre channel." Information Theory Workshop—Fall (ITW), 2015 IEEE. IEEE, 2015.
Hranilovic, Steve, and Frank R. Kschischang. "Optical intensity-modulated direct detection channels: signal space and lattice codes." IEEE Transactions on Information Theory 49.6 (2003): 1385-1399.
Böcherer, G.; Steiner, F.; Schulte, P.: "Bandwidth Efficient and Rate-Matched Low-Density Parity-Check Coded Modulation". IEEE Trans. Commun., Oct. 2015.
Schulte, P.; Böcherer, G.: "Constant Composition Distribution Matching". IEEE Trans. Inf. Theory, Dec. 2015.
Liu, Tao, and Ivan B. Djordjevic. "On the optimum signal constellation design for high-speed optical transport networks." Optics express 20.18, 20396-20406 (2012).
Cisco Global Cloud Index: Forecast and Methodology, 2015-2020, White Paper, 2016.
Haus, Hermann A., and William S. Wong. "Solitons in optical communications." Reviews of modem physics 68.2 (1996): 423.
Doran, N., and K. Blow. "Solitons in optical communications." IEEE journal of quantum electronics 19.12 (1983): 1883-1888.
Hasegawa, Akira, and Takayuki Nyu. "Eigenvalue communication." Journal of lightwave technology 11.3 (1993): 395-399.
Nannapaneni, Chandana, et al. "Constellation Shaping for Communication Channels with Quantized Outputs," 45th Annual Conference on Information Sciences and Systems (CISS), 2011 pp. 1-6.
Arafa, T., et al., "Performance of combined constellation shaping and bit interleaved coded modulation with iterative decoding (BICM-ID)," Advances in Radio Science, 2011, pp. 195-201.
Vandana, A., et al., "A Review of Constellation Shaping and BICM-ID of Ldpc Codes for DVB-S2 Systems," International Journal of Advanced Information and Communication Technology (IJAICT) vol. 1, No. 1, 2014, pp. 98-102.
Arabaci, Murat, et al., "Nonbinary LDPC-Coded Modulation for High-Speed Optical Fiber Communication Without Bandwidth Expansion," IEEE Photonics Journal, vol. 4, No. 3, 2012, pp. 728-734.
"Mathematical Optimization," Wikipedia, as retrieved from: https://en.wikipedia.org/wiki/Mathematical_optimization on Feb. 13, 2019.
Buchali, Fred, et al. "Experimental demonstration of capacity increase and rate-adaptation by probabilistically shaped 64-QAM." 2015 European Conference on Optical Communication (ECOC). IEEE, 3 pages.
Baur, S. et al, "Arithmetic Distribution Matching", Aug. 18, 2014, available online at https://arxiv.org/pdf/1408.3931.pfg , 6 pages.
Forney, G. D. "Trellis Shaping." IEEE Transactions on Information Theory 38.2 (1992): 281-300.
Dar, Ronen, et al. "Inter-Channel Nonlinear Interference Noise in WDM Systems: Modeling and Mitigation." Journal of Lightwave Technology 33.5 (2014): 1044-1053.
Dar, Ronen, et al. "Mitigation of inter-channel nonlinear interference in WDM systems." 2014 the European Conference on Optical Communication (ECOC). IEEE, 2014: (3 pages).
Dar, Ronen, et al. "Accumulation of nonlinear interference noise in fiber-optic systems." Optics Express 22.12 (2014): 14199-14211.
Dar, Ronen, et al. "On Shaping Gain in the Nonlinear Fiber-Optic Channel." 2014 IEEE International Symposium on Information Theory. IEEE, 2014. (5 pages).
Dar, Ronen, et al. "Finite-Memory Prediction as Well as the Empirical Mean." IEEE Transactions on Information Theory 60.8 (2014): 4526-4543.
Dar, Ronen, et al. "Time varying ISI model for nonlinear interference noise." Optical Fiber Communication Conference. Optical Society of America, 2014. (3 pages).
Dar, Ronen, et al. "New Bounds on the Capacity of the Nonlinear Fiber-Optic Channel." Optics letters 39.2 (2014): 398-401.
Buchali, F., et al. "Performance and Advantages of 100 Gb/s QPSK/8QAM Hybrid Modulation Formats." Optical Fiber Communication Conference. Optical Society of America, 2015.
Buchali, Fred, et al. "Low Latency Digital Regenerator for Dual Polarization QAM Signals." 2015 European Conference on Optical Communication (ECOC). IEEE, 2015. (3 pages).
Buchali, Fred, et al. "4D-CMA: Enabling Separation of Channel Compensation and Polarization Demultiplex." Optical Fiber Communication Conference. Optical Society of America, 2015.
Schulte, Patrick et al, "Constant Composition Distribution Matching", Mar. 17 2015, available online at https://arXiv.org/pdf/1502.05133.pdf, 5 pages.
Böcherer, Georg et al, "Bandwidth Efficient and Rate-Matched Low-Density Parity-Check Coded Modulation", Apr. 22, 2015, available online at https://arxiv.org/pdf/1502.02733.pdf, 13 pages.

* cited by examiner

100

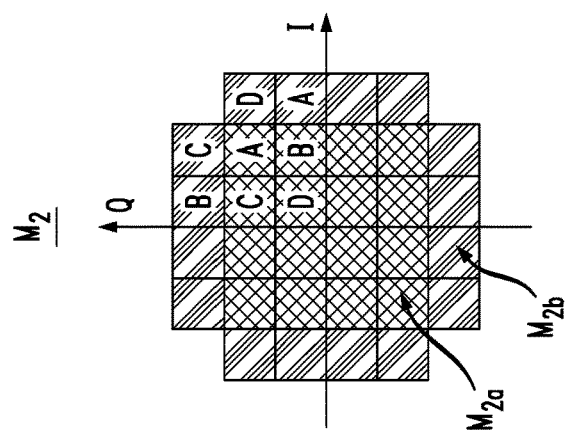
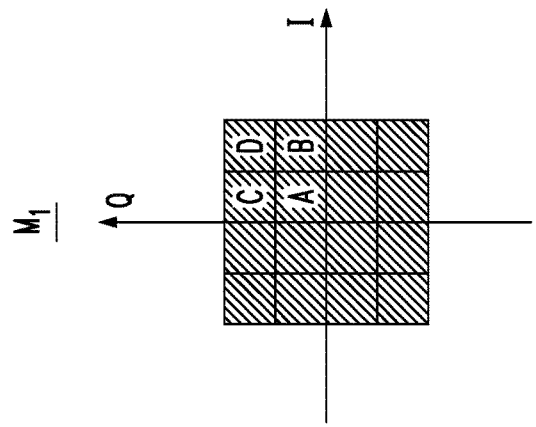
FIG. 3A  FIG. 3B  FIG. 3C

LOW-COMPLEXITY CONSTELLATION SHAPING

BACKGROUND

Field

The present disclosure relates to communication equipment and, more specifically but not exclusively, to methods and apparatus for transmitting and receiving communication signals using constellation shaping.

Description of the Related Art

This section introduces aspects that may help facilitate a better understanding of the disclosure. Accordingly, the statements of this section are to be read in this light and are not to be understood as admissions about what is in the prior art or what is not in the prior art.

Constellation shaping can beneficially provide energy savings often referred to as the shaping gain. In a representative implementation of constellation shaping, constellation symbols of a relatively large energy are transmitted less frequently than constellation symbols of a relatively small energy. For example, when constellation symbols are selected for transmission over a linear communication channel according to a continuous Gaussian distribution in every dimension of the operative constellation, the shaping gain can theoretically approach 1.53 dB.

SUMMARY OF SOME SPECIFIC EMBODIMENTS

Disclosed herein are various embodiments of a transmitter that uses at least first and second fixed constellations in which the same bit-words are assigned to different respective constellation symbols of different respective transmit energies. The transmitter generates an outgoing data frame by first generating two data frames using the first and second constellations, respectively, and then selecting the one of the two data frames that has the lower total transmit energy and discarding the other. The first and second constellations are constructed in a manner that enables the transmitter to realize a significant shaping gain. Some embodiments of the transmitter are compatible with the use of forward-error-correction coding and provide a shaping gain for the transmission of both information and parity bits. An example embodiment of the transmitter can advantageously be implemented with relatively low complexity by employing constellation mappers and demappers that operate using relatively small look-up tables. Various embodiments of the transmitter can be adapted for optical, wireless, and wire-line communication channels.

According to an example embodiment, provided is an apparatus comprising: a first constellation mapper configured to generate a first data frame by mapping each bit-word of a first set of bit-words onto a corresponding constellation symbol of a first constellation, the first frame having a first cost; a second constellation mapper configured to generate a second data frame by mapping each bit-word of the first set of bit-words onto a corresponding constellation symbol of a second constellation, the second frame having a second cost; and a selecting switch configured to select one of the first data frame and the second data frame based on a comparison of the first cost and the second cost.

BRIEF DESCRIPTION OF THE DRAWINGS

Other aspects, features, and benefits of various disclosed embodiments will become more fully apparent, by way of example, from the following detailed description and the accompanying drawings, in which:

FIGS. 3A-3C show an example structure of the constellations that can be used in the communication system of FIG. 1 according to an embodiment;

FIGS. 7A-7C illustrate example constellations that can be used in the communication system of FIG. 6 according to an embodiment;

DETAILED DESCRIPTION

Modern forward-error-correction (FEC) codes, such as low-density parity-check (LDPC) codes, already approach the constrained Shannon limit to within approximately 0.5 dB. Hence, further investment in the development of better and/or more-sophisticated FEC codes can only provide diminished returns that are limited by this relatively low incremental value of the FEC-coding gain. For comparison, a practically attainable value of the shaping gain can be approximately 1 dB for linear channels, and even higher for nonlinear channels. Due to the latter value being higher than the incremental value of the FEC-coding gain, development of methods and apparatus for constellation shaping is currently being pursued by the telecom industry. Constellation-shaping methods that can be implemented with relatively low complexity and/or cost appear to be especially desirable.

Figure 1:
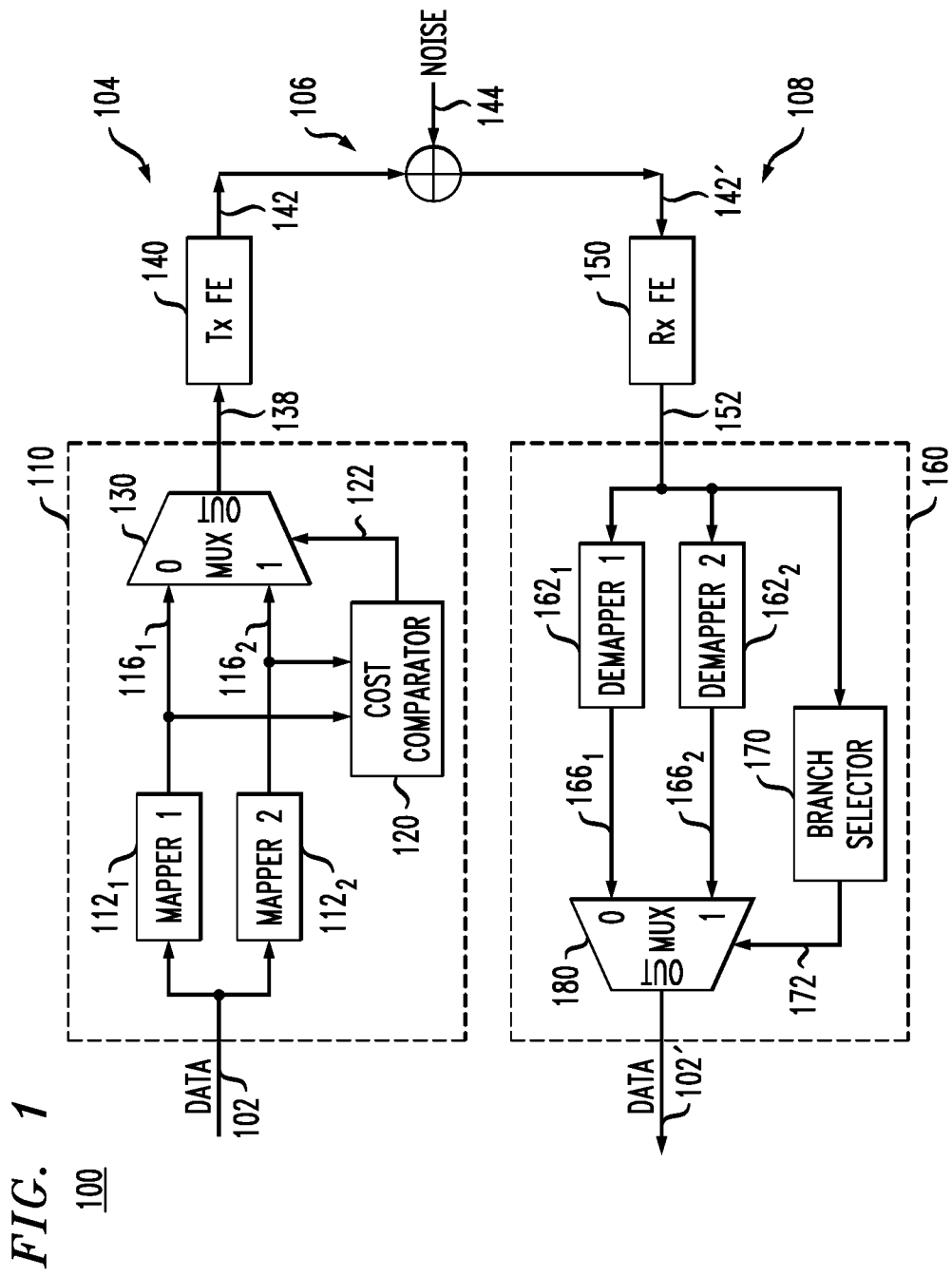
FIG. 1 shows a block diagram of a communication system according to an embodiment.

FIG. 1 shows a block diagram of a communication system 100 according to an embodiment. System 100 comprises a transmitter 104 and a receiver 108 that are coupled to one another by way of a communication link 106. In various embodiments, communication link 106 can be an optical link, a wireless link, or a wire-line link.

System 100 implements constellation shaping using a shaping encoder 110 at transmitter 104 and a shaping decoder 160 at receiver 108. Shaping encoder 110 operates to transform an input data stream 102 into a corresponding sequence 138 of constellation symbols in which different constellation symbols appear with different respective frequencies. A front-end (FE) module 140 of transmitter 104 then uses sequence 138 to generate a corresponding modulated communication signal 142 suitable for transmission over link 106 and having encoded thereon the constellation symbols of sequence 138.

Link 106 imparts a noise 144 and possibly other linear and/or nonlinear signal impairments (not explicitly shown in FIG. 1) onto communication signal 142 and delivers a resulting impaired (e.g., noisier) communication signal 142' to an FE module 150 of receiver 108. FE module 150 operates to convert the received communication signal 142' into a corresponding sequence 152 of constellation symbols. Shaping decoder 160 then converts sequence 152 into an output data stream 102'. Provided that the described signal processing in system 100 produces no errors, output data stream 102' is the same as input data stream 102.

If noise 144 and/or other signal impairments imparted onto the received communication signal 142' by link 106 are relatively strong, then additional measures can be taken to cause output data stream 102' to have an acceptably low bit-error rate (BER). An example of such measures is described in more detail below in reference to FIGS. 6-7. Implementation details of FE modules 140 and 150 depend on the type of link 106 and are known to those skilled in the pertinent art.

Shaping encoder 110 comprises constellation mappers $112_1$ and $112_2$ that use different respective constellations to convert each bit-word of input data stream 102 into a corresponding constellation symbol, thereby generating constellation-symbol sequences $116_1$ and $116_2$, respectively. The two constellations used by constellation mappers $112_1$ and $112_2$, hereafter referred to as $M_1$ and $M_2$, respectively, differ from each other in their cost-function characteristics. Several examples of constellations $M_1$ and $M_2$ are described in more detail below in reference to FIGS. 3 and 7.

As used herein the term "cost function" refers to a common metric by which constellation symbols of various constellations can be characterized. In an example implementation, the cost function assigns to each constellation symbol a corresponding real number that represents some "cost" associated with the constellation symbol. One example of such cost is the relative transmit energy corresponding to the constellation symbol. Other examples of the "cost" include but are not limited to the variance of the energy of a set of constellation symbols, and a weighted sum of the transmit energy and the variance of energy.

Shaping encoder 110 further comprises a cost comparator 120 that operates to compare the costs associated with the corresponding data frames of constellation-symbol sequences $116_1$ and $116_2$.

As used herein, the term "data frame" refers to a set of constellation symbols, e.g., from a sequence of constellation symbols, such as sequence $116_1$ or sequence $116_2$. The corresponding data frames in sequences $116_1$ and $116_2$ are generated based on the same set of bit-words of input data stream 102 and can be synchronous with one another. The data frame has a fixed length N, where N is the number of constellation symbols in the data frame. The value of N is fixed, but can differ for different constellation-shaping algorithms. In other words, N is a parameter of the constellation-shaping algorithm used in system 100.

Based on the cost comparison, cost comparator 120 generates a control signal 122 for a multiplexer (MUX) 130. The logic value of control signal 122 can change every data-frame period. Control signal 122 causes MUX 130 to select and connect to an output port OUT: (i) an input port 0, if the cost of the data frame from sequence $116_1$ is the same or smaller than the cost of the corresponding data frame from sequence $116_2$; or (ii) an input port 1, if the cost of the data frame from sequence $116_1$ is greater than the cost of the corresponding data frame from sequence $116_2$. As a result, MUX 130 generates sequence 138 by passing thereto the selected data frames from sequences $116_1$ and $116_2$. In some embodiments, control signal 122 can be randomly chosen between 0 and 1 if the cost corresponding to the data frame from sequence $116_1$ and the cost corresponding to the data frame from sequence $116_2$ are the same such that the choices of the input ports 0 and 1 are equiprobable, which makes the output constellation symmetric.

In an example embodiment, control signal 122 is de-asserted (e.g., is "low" or corresponds to a binary "zero") if the cost of the data frame from sequence $116_1$ is the same or smaller than the cost of the corresponding data frame from sequence $116_2$. In this configuration, output port OUT is connected to input port 0. Control signal 122 is asserted (e.g., is "high" or corresponds to a binary "one") if the cost of the data frame from sequence $116_1$ is greater than the cost of the corresponding data frame from sequence $116_2$. In this configuration, output port OUT is connected to input port 1. In some embodiments, control signal 122 can be either de-asserted or asserted with equal probability if the cost corresponding to the data frame from sequence $116_1$ is the same as the cost corresponding to the data frame from sequence $116_2$.

Shaping decoder 160 includes demappers $162_1$ and $162_2$ and a branch selector 170, each of which receives a copy of sequence 152 from FE module 150. Demapper $162_1$ uses constellation $M_1$ to convert constellation symbols of sequence 152 into the corresponding bit-words, thereby generating a data stream $166_1$. Demapper $162_2$ similarly uses constellation $M_2$ to convert constellation symbols of sequence 152 into the corresponding bit-words, thereby generating a data stream $166_2$.

Branch selector 170 analyzes each data frame of sequence 152 to determine whether the data frame was generated at shaping encoder 110 using constellation $M_1$ or constellation $M_2$. Based on the analysis, branch selector 170 generates a control signal 172 for a MUX 180. The logic value of control signal 172 can change every data-frame period. Control signal 172 causes MUX 180 to select and connect to an output port OUT: (i) an input port 0, if branch selector 170 determines that the data frame was generated using constellation $M_1$; or (ii) an input port 1, if branch selector 170 determines that the data frame was generated using constellation $M_2$. An example method of analyzing data frames of sequence 152 that can be used in branch selector 170 to determine whether the data frame was generated at shaping encoder 110 using constellation $M_1$ or constellation $M_2$ is described in more detail below in reference to FIG. 5.

In an example embodiment, control signal 172 is (i) de-asserted to pass through MUX 180 a portion of data stream $166_1$ and (ii) asserted to pass through MUX 180 a portion of data stream $166_2$. As such, MUX 180 generates output data sequence 102' by passing thereto the selected sets of bit-words from sequences $166_1$ and $166_2$, with the selection being made in accordance with control signal 172. In some embodiments, MUX 180 can be implemented as a nominal copy of MUX 130.

Figure 2:
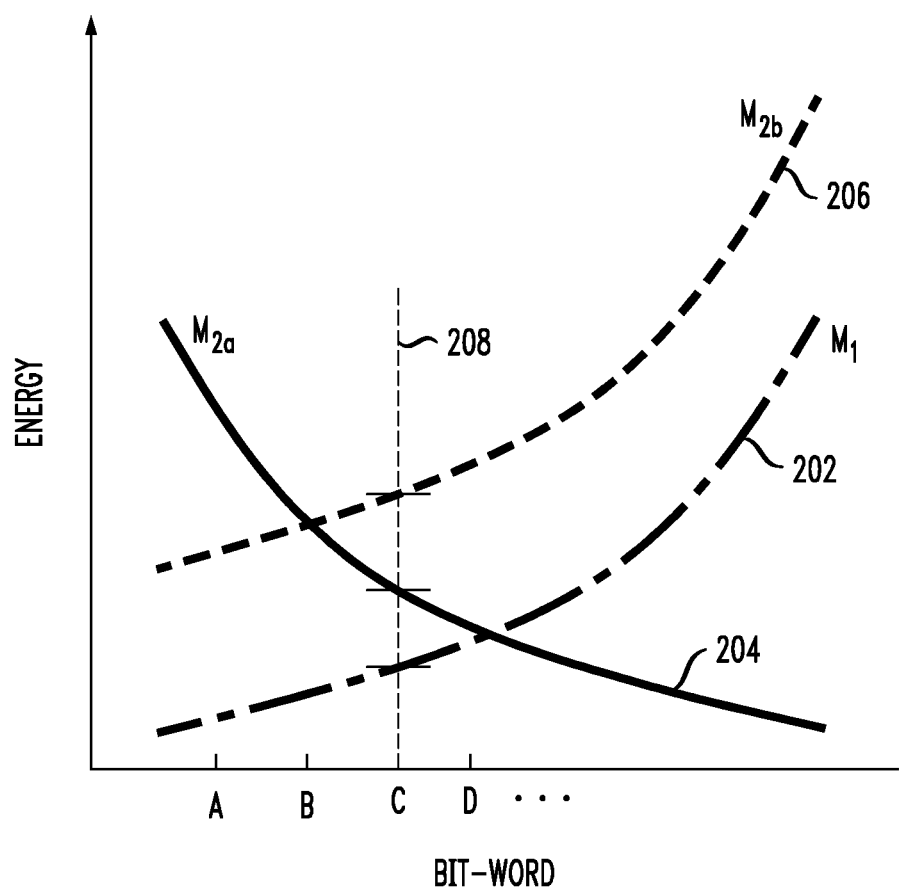
FIG. 2 graphically shows example cost-function characteristics of the constellations that can be used in the communication system of FIG. 1 according to an embodiment.

FIG. 2 graphically shows example cost-function characteristics of constellations $M_1$ and $M_2$ that can be used in system 100 (FIG. 1) according to an embodiment. In this particular embodiment, the "cost" is the relative transmit energy associated with the constellation symbol. Constellation $M_1$ is a conventional m-QAM constellation in which the m constellation symbols (geometrically represented by points on a complex plane) are arranged on a rectangular grid on the complex plane. If we sort the m constellation symbols of $M_1$ in the ascending order of the corresponding transmit energy and label the binary values (bit-words) assigned to the sorted constellation symbols using the consecutive letters of the alphabet (e.g., A, B, C, D, . . . ), then the transmit energy in $M_1$ as a function of the bit-word can be approximately visualized using a curve 202.

Constellation $M_2$ is constructed in the following manner. Constellation $M_2$ has a size of 2m and includes two non-overlapping sub-constellations of size m each, hereafter referred to as sub-constellations $M_{2a}$ and $M_{2b}$, respectively. Sub-constellation $M_{2a}$ has the same set of constellation symbols as constellation $M_1$. However, the bit-words A, B, C, D, . . . are now assigned to the constellation symbols of $M_{2a}$ to produce an inverse (e.g., descending) transmit-energy order. As a result, the transmit energy in sub-constellation $M_{2a}$ as a function of the bit-word can be approximately visualized using a curve 204.

Sub-constellation $M_{2b}$ has m constellation symbols that lie outside sub-constellation $M_{2a}$ in a complex-plane area that is adjacent thereto. As such, sub-constellation $M_{2b}$ can be conceptually viewed as an extension of constellation $M_1$ or sub-constellation $M_{2a}$. The bit-words A, B, C, D, . . . are assigned to the constellation symbols of sub-constellation $M_{2b}$ to produce an ascending transmit-energy order that is qualitatively similar to that of constellation $M_1$. The transmit energy in sub-constellation $M_{2b}$ as a function of the bit-word can be approximately visualized using a curve 206. Curve 206 is vertically offset with respect to curve 202 because, on average, the constellation symbols (points) of sub-constellation $M_{2b}$ are farther from the origin of the complex plane than the constellation symbols (points) of constellation $M_1$.

Note that each of bit-words A, B, C, D, . . . is assigned to the constellation symbols of constellations $M_1$ and $M_2$ in a redundant manner. More specifically, in this particular example, each of bit-words A, B, C, D is assigned to three different constellation symbols: one from constellation $M_1$; one from sub-constellation $M_{2a}$; and one from sub-constellation $M_{2b}$. Each of these three constellation symbols has a different respective transmit energy, e.g., as indicated in FIG. 2 by a reference line 208 corresponding to the bit-word C. This redundancy creates a coding dimension that enables shaping encoder 110 to convert the incoming bit-words of input data stream 102 into constellation symbols of sequence 138 in a manner that causes constellation symbols of higher energy to occur less frequently than constellation symbols of lower energy, thereby effecting a shaping gain for system 100. Numerical simulations show that, depending on the size of constellations $M_1$ and $M_2$ and the manner in which data frames are generated by shaping encoder 110, the shaping gain can beneficially be in the approximate range between 0.5 dB and 0.8 dB. Importantly, this shaping gain can advantageously be realized with an implementation complexity that is significantly lower than a typical implementation complexity corresponding to comparably performing conventional shaping encoders/decoders.

FIGS. 3A-3C show an example structure of constellations $M_1$ and $M_2$ that can be used in system 100 (FIG. 1) according to an embodiment. More specifically, FIGS. 3A-3B show geometric representations of constellations $M_1$ and $M_2$, respectively. FIG. 3C shows a table that lists the transmit energies corresponding to various bit-words in constellations $M_1$ and $M_2$. In this particular example, m=16. Hence, $M_1$ is a 16-QAM constellation, and $M_2$ is a 32-QAM constellation. Due to the symmetry of the used 16-QAM and 32-QAM constellations, only the constellation symbols located in the first quadrant of the complex plane are described. A person of ordinary skill in the art will understand that the constellation symbols located in each of the other three quadrants of the complex plane can be treated and described in a similar manner.

Each small square in FIGS. 3A-3B represents a respective constellation symbol. In digital signal processing, each constellation symbol is conventionally represented by a respective complex number. Each constellation symbol is also assigned a respective binary value or bit-word. FIGS. 3A-3C use the same nomenclature as FIG. 2, in which each such bit-word is denoted using a corresponding letter, e.g., A, B, C, D. In the particular example shown in FIGS. 3A-3C, each letter represents a respective hexadecimal value or a bit-word consisting of four bits. A constellation mapper, such as a mapper 112 (FIG. 1), operates to convert a bit-word into a corresponding complex number in accordance with the operative constellation map, such as either of the maps shown in FIGS. 3A-3B. For redundant constellation maps, such as the map shown in FIG. 3B, the constellation mapper applies appropriate selection rules to select one of the two or more constellation symbols to which the same bit-word is redundantly assigned. A constellation demapper, such as a demapper 162 (FIG. 1), performs an inverse operation that converts a complex number into a corresponding bit-word, also in accordance with the operative constellation map.

Comparison of the locations of constellation symbols corresponding to bit-words A-D in constellation $M_1$ (FIG. 3A) and sub-constellation $M_{2a}$ (FIG. 3B) provides a concrete example of the reordering described above in reference to FIG. 2. The columns corresponding to $M_1$ and $M_{2a}$ in the table of FIG. 3C reveal the above-mentioned ascending and descending transmit-energy orders of bit-words A-D in constellation $M_1$ and sub-constellation $M_{2a}$, respectively. FIG. 3B also shows the "locations" of bit-words A-D in sub-constellation $M_{2b}$. The column corresponding to $M_{2b}$ in the table of FIG. 3C illustrates the above-mentioned ascending transmit-energy order of bit-words A-D in sub-constellation $M_{2b}$.

Figure 4:
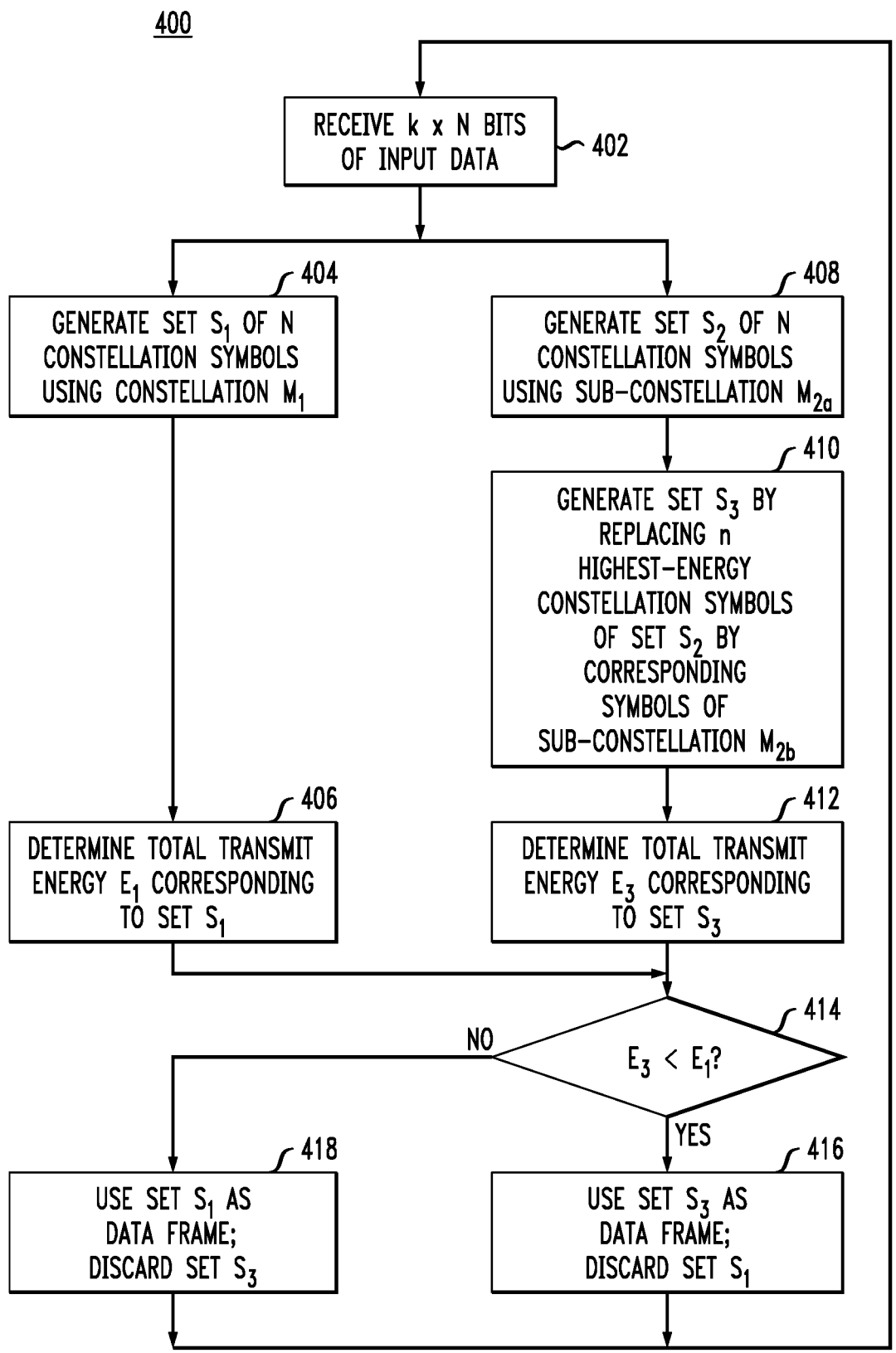
FIG. 4 shows a flowchart of a method of generating data frames that can be used at the transmitter of the communication system of FIG. 1 according to an embodiment.

FIG. 4 shows a flowchart of a method 400 of generating data frames that can be used in shaping encoder 110 (FIG. 1) according to an embodiment. In this embodiment, $M_1$ is an m-QAM constellation, and $M_2$ is a 2m-QAM constellation. Method 400 causes shaping encoder 110 to convert N bit-words received via input data stream 102 into a corresponding data frame of sequence 138, wherein the data frame has N constellation symbols. Each of the N bit-words has a length of k bits, where $2^k$=m.

At step 402 of method 400, shaping encoder 110 receives k×N bits via input data stream 102. The received bits are parsed into N bit-words, each having a length of k bits.

At step 404, constellation mapper $112_1$ uses constellation $M_1$ to convert the N bit-words of step 402 into the corresponding first set (data frame $S_1$) of N constellation symbols.

At step 406, cost comparator 120 first determines the transmit energy corresponding to each of the N constellation symbols of the set $S_1$. In an example embodiment, this determination can be carried out using a look-up table (LUT) that lists the transmit energies of all constellation symbols from constellations $M_1$ and $M_2$. Cost comparator 120 then proceeds to determine the total transmit energy ($E_1$) corresponding to the set $S_1$ by summing up the transmit energies corresponding to the individual constellation symbols thereof.

At step 408, constellation mapper $112_2$ uses sub-constellation Mea to convert the N bit-words of step 402 into the corresponding second set (data frame $S_2$) of N constellation symbols.

At step 410, constellation mapper $112_2$ first identifies n constellation symbols in the set $S_2$ for which the corresponding transmit energies are the highest in the set $S_2$. Constellation mapper $112_2$ then generates a third set ($S_3$) of N constellation symbols by replacing each of the n identified constellation symbols of the set $S_2$ by the corresponding constellation symbol of sub-constellation $M_{2b}$ to which the same bit-word is redundantly assigned (also see FIG. 3B). In an example embodiment, n=1. In alternative embodiments, any integer value of n<N can similarly be used.

At step 412, cost comparator 120 first determines the transmit energy corresponding to each of the N constellation symbols of the set $S_3$, e.g., using the above-mentioned LUT. Cost comparator 120 then proceeds to determine the total transmit energy ($E_3$) corresponding to the set $S_3$ by summing up the transmit energies corresponding to the individual constellation symbols thereof.

At step 414, cost comparator 120 compares the total energies $E_1$ and $E_3$ determined at steps 406 and 412, respectively. If it is determined that $E_3<E_1$, then the processing of method 400 is directed to step 416. Otherwise, the processing of method 400 is directed to step 418.

At step 416, cost comparator 120 generates control signal 122 in a manner that causes MUX 120 to select the set $S_3$ as the data frame corresponding to the k×N bits received at step 402. As a result, MUX 120 passes through the N constellation symbols of the set $S_3$, thereby generating a corresponding portion of sequence 138. The set $S_1$ is discarded. The processing of method 400 is returned back to step 402.

At step 418, cost comparator 120 generates control signal 122 in a manner that causes MUX 120 to select the set $S_1$ as the data frame corresponding to the k×N bits received at step 402. As a result, MUX 120 passes through the N constellation symbols of the set $S_1$, thereby generating a corresponding portion of sequence 138. The set $S_3$ is discarded. The processing of method 400 is returned back to step 402.

Figure 5:
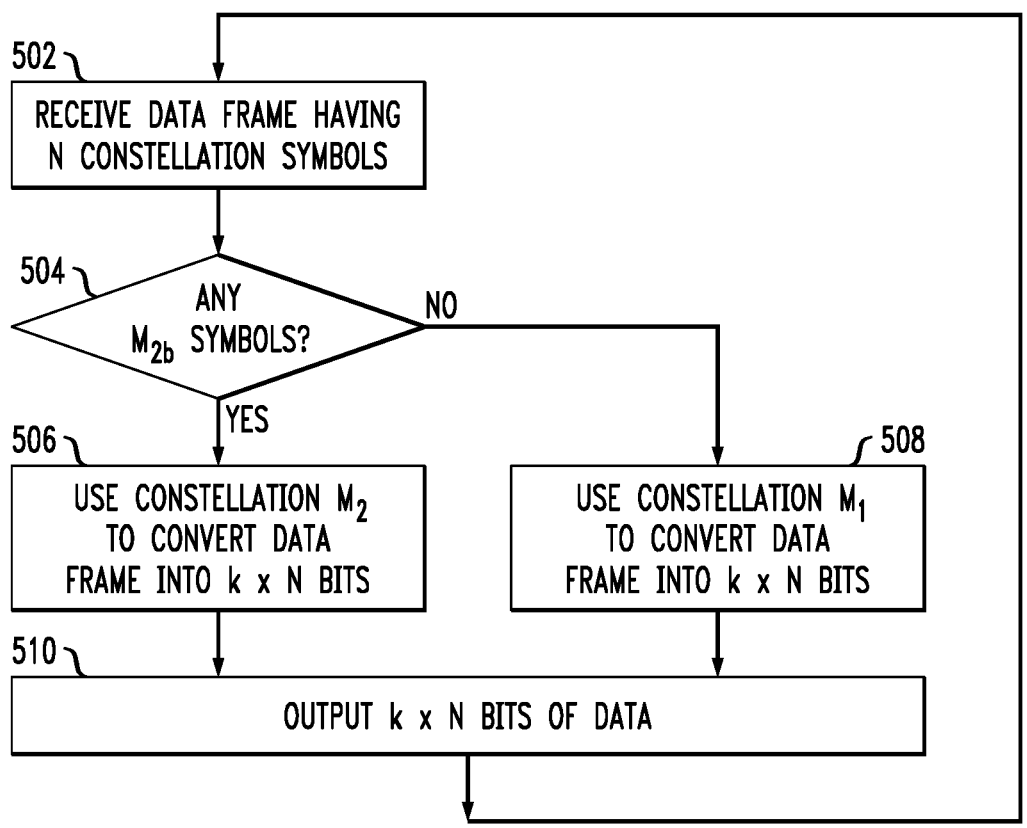
FIG. 5 shows a flowchart of a method of decoding data frames that can be used at the receiver of the communication system of FIG. 1 according to an embodiment.

FIG. 5 shows a flowchart of a method 500 of decoding data frames that can be used in shaping decoder 160 (FIG. 1) according to an embodiment. Method 500 is designed to work in conjunction with method 400 (FIG. 4).

At step 502 of method 500, shaping decoder 160 receives, via sequence 152, a data frame having N constellation symbols.

At step 504, branch selector 170 determines whether or not any of the constellation symbols of the data frame received at step 502 belongs to sub-constellation $M_{2b}$. Branch selector 170 asserts or de-asserts control signal 172 accordingly. If there is an $M_{2b}$ constellation symbol in the received data frame, then the processing of method 500 is directed to step 506. Otherwise, the processing of method 500 is directed to step 508.

The determination of step 504 is relatively straightforward to make because sub-constellation $M_{2b}$ has no constellation points in common with either sub-constellation Mea or constellation $M_1$. Provided that FE module 150 recovers the data frame of step 502 without an error, the data frame can contain a constellation symbol belonging to sub-constellation $M_{2b}$ only if that data frame was generated at shaping encoder 110 using steps 408-416 of method 400 (see FIG. 4).

At step 506, demapper $162_2$ uses constellation $M_2$ to convert the N constellation symbols of the data frame received at step 502 into the N corresponding bit-words. The N bit-words are appropriately concatenated to generate k×N bits for output data stream 102'.

At step 508, demapper $162_1$ uses constellation $M_1$ to convert the N constellation symbols of the data frame received at step 502 into the N corresponding bit-words. The N bit-words are appropriately concatenated to generate k×N bits for output data stream 102'.

At step 510, MUX 180 outputs the k×N bits generated at step 506 or step 508, thereby generating a corresponding portion of output data stream 102'. Control signal 172 generated by branch selector 170 causes MUX 180 to select and output the correct set of k×N bits as already explained above in reference to FIG. 1. After step 510, the processing of method 500 is returned back to step 502.

Figure 6:
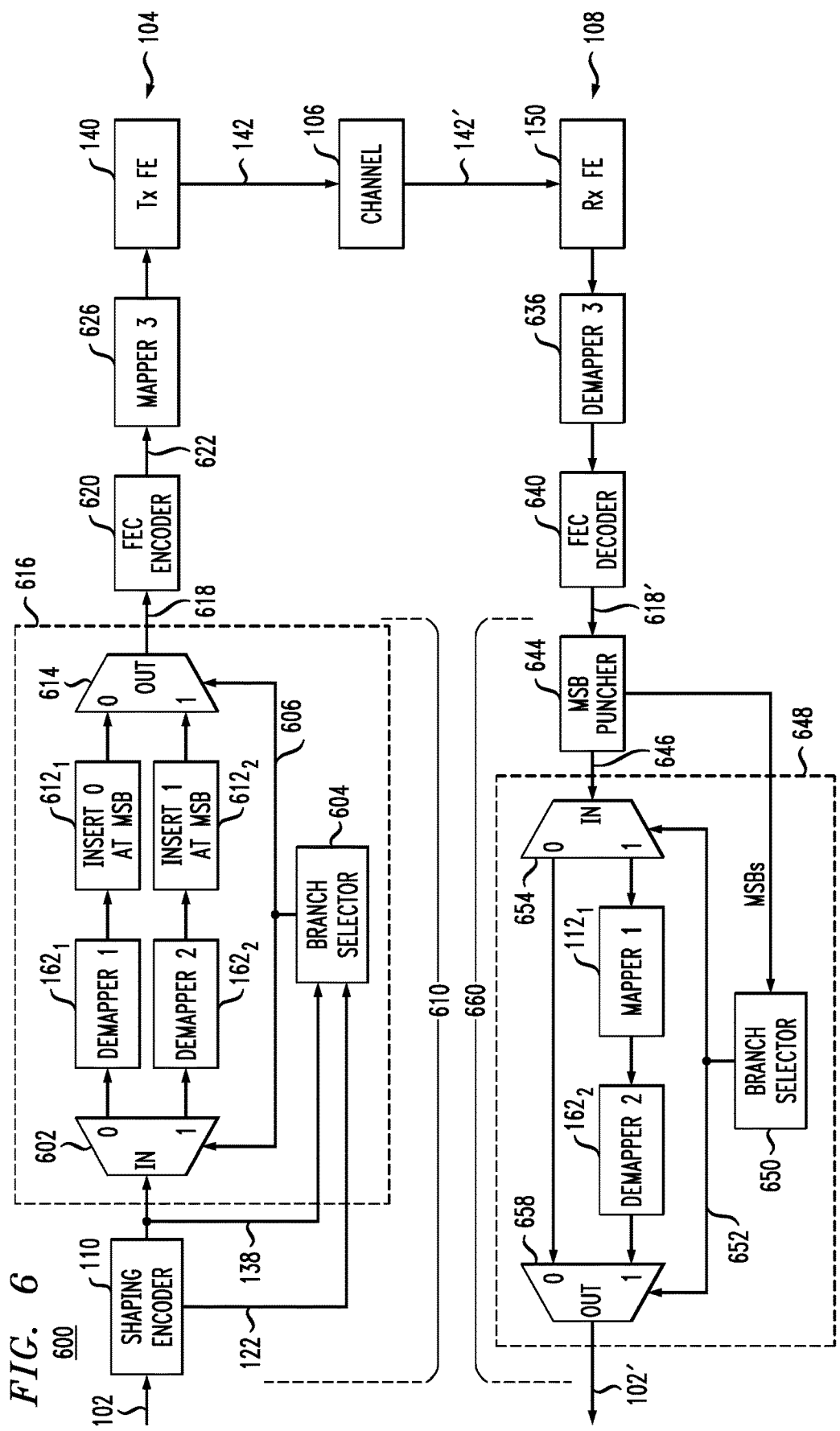
FIG. 6 shows a block diagram of a communication system according to an alternative embodiment.

FIG. 6 shows a block diagram of a communication system 600 according to an alternative embodiment. System 600 differs from system 100 (FIG. 1) in that it uses FEC coding in addition to constellation shaping. However, system 600 still employs many of same system components as system 100. These system components are labeled in FIG. 6 using the same labels as in FIG. 1, and the description of these system components is not repeated here. Instead, the description of system 600 given below is mostly focused on the differences between the two systems.

Transmitter 104 in system 600 includes a systematic FEC encoder 620 that performs FEC encoding thereat in a conventional manner. More specifically, FEC encoder 620 receives an input bit sequence 618 and converts it into an expanded bit sequence (codeword) 622 by appending to the input bit sequence a set of parity bits generated in accordance with the operative FEC algorithm. Input bit sequence 618 is generated in transmitter 104 using a shaping encoder 610 that includes shaping encoder 110 (see FIG. 1) and a shaping demapper 616. Because shaping encoder 110 outputs constellation symbols while FEC encoder 620 operates on bits, shaping demapper 616 converts each data frame of sequence 138 generated by shaping encoder 110 into a corresponding bit sequence on which the FEC encoder can operate. Shaping demapper 616 performs this conversion in a manner that enables a post-FEC constellation mapper 626 to preserve at least some of the above-indicated beneficial effects of the constellation shaping imposed by shaping encoder 110. The constellation used in constellation mapper 626 is hereafter referred to as constellation $M_3$. Pertinent characteristics of constellation $M_3$ are described in more detail below in continued reference to FIG. 6. An example embodiment of constellation $M_3$ is shown and described in reference to FIG. 7C.

Shaping demapper 616 has two processing branches connected between a de-multiplexer (DMUX) 602 and a MUX 614 as indicated in FIG. 6. The "upper" processing branch of shaping demapper 616 comprises demapper $162_1$ and a bit-word expander 6121. The "lower" processing branch of shaping demapper 616 comprises demapper $162_2$ and a bit-word expander 6122. Configurations of DMUX 602 and MUX 614 are controlled, via a control signal 606, by a branch selector 604. If control signal 606 is de-asserted, then a corresponding constellation symbol of sequence 138 is processed by the upper branch of shaping demapper 616. If control signal 606 is asserted, then a corresponding constellation symbol of sequence 138 is processed by the lower branch of shaping demapper 616.

In an example embodiment, branch selector 604 can generate control signal 606 based on control signal 122 (also see FIG. 1) and the current constellation symbol of sequence 138 as follows.

If control signal 122 is de-asserted, then branch selector 604 de-asserts control signal 606 without giving any regard to the current constellation symbol of sequence 138. Recall from the description of FIG. 1 that shaping encoder 110 de-asserts control signal 122 when the received bit-word is being mapped using constellation $M_1$ (also see FIGS. 2-3). In this situation, demapper $162_1$ of the upper branch of shaping demapper 116 simply recovers the original bit-word. Bit-word expander 6121 then increases the length of that bit-word by prepending, at the most-significant-bit (MSB) position, a binary "zero." The resulting expanded bit-word is then passed through by MUX 614 as a corresponding portion of bit sequence 618.

If control signal 122 is asserted, then the state of control signal 606 depends on the current constellation symbol of sequence 138. Recall from the description of FIG. 1 that shaping encoder 110 asserts control signal 122 when the received bit-word is being mapped using constellation $M_2$ (also see FIGS. 2-3). Further recall that the redundant nature of constellation $M_2$ (e.g., see FIG. 3B) may cause the received bit-word to be mapped using either sub-constellation $M_{2a}$ or sub-constellation $M_{2b}$.

If control signal 122 is asserted and the current constellation symbol belongs to sub-constellation $M_{2a}$, then branch selector 604 de-asserts control signal 606. In this situation, demapper 162$_1$ of the upper branch of shaping demapper 116 does not recover the original bit-word, but causes it to be converted into a different bit-word. The correspondence between the original bit-word and the resulting different bit-word is dictated by the manner in which bit-words are assigned to constellation symbols in constellation $M_1$ and sub-constellation $M_{2a}$. Bit-word expander 612$_1$ then increases the length of that "different" bit-word by prepending, at the MSB position, a binary "zero." The resulting expanded bit-word is then passed through by MUX 614 as a corresponding portion of bit sequence 618.

If control signal 122 is asserted and the current constellation symbol belongs to sub-constellation $M_{2b}$, then branch selector 604 asserts control signal 606. In this situation, demapper 162$_2$ of the lower branch of shaping demapper 116 simply recovers the original bit-word. Bit-word expander 612$_2$ then increases the length of that bit-word by prepending, at the MSB position, a binary "one." The resulting expanded bit-word is then passed through by MUX 614 as a corresponding portion of bit sequence 618.

Since each of the original bit-words used in shaping encoder 110 has a length of k bits, each of the expanded bit-words of bit sequence 618 has a length of (k+1) bits.

In an example embodiment, constellation $M_3$ used in constellation mapper 626 can be constructed based on constellations $M_1$ and $M_2$ as explained below.

Constellation $M_3$ has the same set of constellation points (symbols) as constellation $M_2$. However, the manner in which bit-words are assigned to different constellation points in $M_3$ is different from that in $M_2$. A first difference is that each constellation point in $M_3$ is assigned a respective expanded bit-word, i.e., a bit-word whose length is (k+1) bits. In contrast, each constellation point in $M_2$ is assigned a non-expanded bit-word, i.e., a bit-word whose length is k bits. A second difference is that (expanded) bit-words are assigned to different constellation points in $M_3$ in a non-redundant manner. This means that there is a one-to-one correspondence between bit-words and constellation points in $M_3$. In contrast, each (non-expanded) bit-word is assigned to two different constellation points in $M_2$ (e.g., see FIG. 3B).

In an example embodiment, expanded bit-words can be assigned to the constellation points of $M_3$ as follows.

First, constellation $M_3$ is partitioned into two sub-constellations that are hereafter referred to as sub-constellation $M_{3a}$ and sub-constellation $M_{3b}$, respectively. Sub-constellation $M_{3a}$ geometrically takes up the same complex-plane area and has the same set of constellation points as sub-constellation $M_{2a}$. Sub-constellation $M_{3b}$ geometrically takes up the same complex-plane area and has the same set of constellation points as sub-constellation $M_{2b}$. Also recall that sub-constellation $M_{2a}$ geometrically takes up the same complex-plane area and has the same set of constellation points as constellation $M_1$ (e.g., see FIGS. 3A-3B). This means that sub-constellation $M_{3a}$ can alternatively be viewed as geometrically taking up the same complex-plane area and having the same set of constellation points as constellation $M_1$.

A constellation point $P_i$ belonging to sub-constellation $M_{3a}$ is assigned a bit-word that has a binary value of (0:$b_i$), where $b_i$ is the bit-word assigned to the same constellation point $P_i$ in constellation $M_1$ and the ":" denotes concatenation. A constellation point $P_j$ belonging to sub-constellation $M_{3b}$ is assigned a bit-word that has a binary value of (1:$b_j$), where $b_j$ is the bit-word assigned to the same constellation point $P_j$ in sub-constellation $M_{2b}$.

Figures 7A, 7B, 7C:
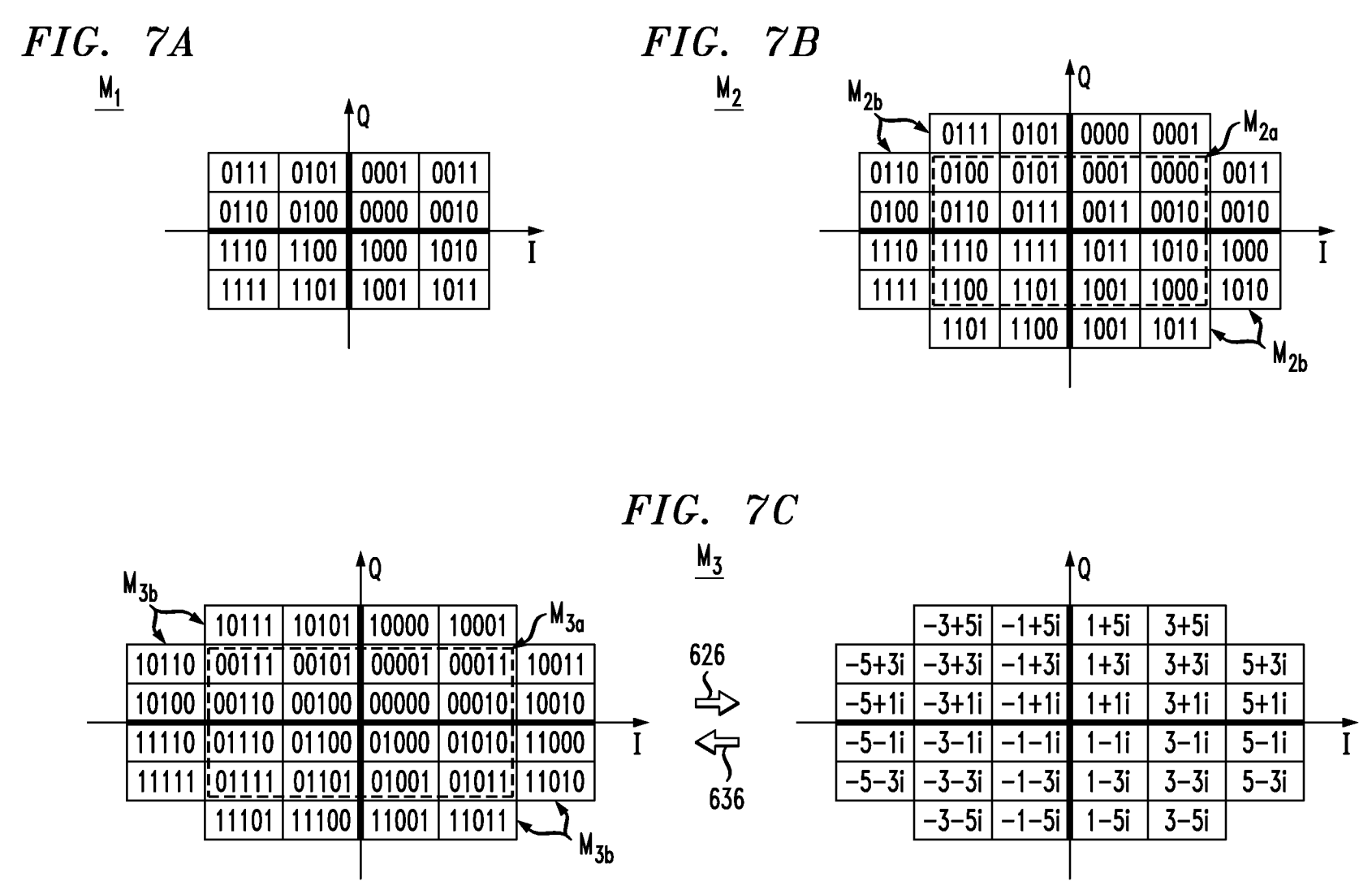

FIGS. 7A-7C illustrate example constellations $M_1$, $M_2$, and $M_3$ that can be used in system 600 (FIG. 6) according to an embodiment. This example corresponds to an embodiment in which: (i) the number of constellation points in $M_1$ is m=16; (ii) the number of constellation points in each of $M_2$ and $M_3$ is 2m=32; (iii) the bit-word length in each of $M_1$ and $M_2$ is k=4; and (iv) the expanded bit-word length in $M_3$ is (k+1)=5.

FIGS. 7A and 7B show the bit-word assignment maps for constellations $M_1$ and $M_2$, respectively. These two constellations can be used both in system 100 (FIG. 1) and in system 600 (FIG. 6). The 4×4 box bounded by the dashed line in FIG. 7B contains the sixteen constellation points of sub-constellation $M_{2a}$. The four 4×1 boxes located just outside of that dashed-line 4×4 box contain the sixteen constellation points of sub-constellation $M_{2b}$.

FIG. 7C shows (i) the bit-word assignment map of constellation $M_3$ in the left panel of the figure and (ii) the complex numbers representing the various constellation symbols (points) of constellation $M_3$ in the right panel of the figure. The block arrow labeled 626 in FIG. 7C indicates the bit-word to constellation symbol conversion performed by constellation mapper 626 in transmitter 104 of system 600 (FIG. 6). The block arrow labeled 636 in FIG. 7C similarly indicates the constellation symbol to bit-word conversion performed by a demapper 636 in receiver 108 of system 600 (see FIG. 6). The 4×4 box bounded by the dashed line in FIG. 7C contains the sixteen constellation points of sub-constellation $M_{3a}$. The four 4×1 boxes located just outside of that dashed-line 4×4 box contain the sixteen constellation points of sub-constellation $M_{3b}$.

Comparison of the bit-words having the same location in constellation $M_1$ (FIG. 7A) and sub-constellation $M_{3a}$ (FIG. 7C, left panel) reveals the above-mentioned relationship between these bit-words as $b_i$ and (0:$b_i$). Comparison of the bit-words having the same location in sub-constellation $M_{2a}$ (FIG. 7B) and sub-constellation $M_{3b}$ (FIG. 7C, left panel) reveals the above-mentioned relationship between these bit-words as $b_j$ and (1:$b_j$). Comparison of the locations of the same bit-word in constellation $M_1$ (FIG. 7A) and sub-constellation $M_{2a}$ (FIG. 7B) provides an example of the bit-word assignment corresponding to curves 202 and 204 (see FIG. 2). Comparison of the locations of the same bit-word in sub-constellations $M_{2a}$ and $M_{2b}$ (FIG. 7B) provides an example of the bit-word assignment corresponding to curves 204 and 206 (see FIG. 2).

Referring back to FIG. 6, at receiver 108, FE module 150, demapper 636, and an FEC decoder 640 operate, as known in the art, to convert communication signal 142' into a corresponding bit sequence 618'. Provided that the FEC code used in FEC encoder 620 and FEC decoder 640 has a sufficient error-correcting capacity for the noise level imparted by channel 106, bit sequence 618' is the same as bit sequence 618 of transmitter 104. A person of ordinary skill in the art will understand how to select an FEC code of adequate error-correcting capacity for any manageable noise level of the communication channel.

Receiver 108 further includes a shaping decoder 660 that operates to convert bit sequence 618' into output data stream 102'. Shaping decoder 660 includes an MSB puncher 644 and a bit-word converter 648. Recall that sequence 618' has expanded bit-words whereas output data stream 102' has bit-words of the original length k. MSB puncher 644 operates to remove the MSBs of the expanded bit-words of sequence 618', thereby generating a bit sequence 646 that has bit-words of the original length k. Bit-word converter 648 then transforms some of the bit-words of sequence 646 to convert that sequence into output data stream 102'.

Bit-word converter 648 has two processing branches connected between a DMUX 654 and a MUX 658 as indicated in FIG. 6. The "upper" processing branch of bit-word converter 648 simply connects the corresponding ports of DMUX 654 and MUX 658, with appropriate insertion delay (not explicitly shown in FIG. 6). The "lower" processing branch of bit-word converter 648 comprises mapper $112_1$ and demapper $162_2$. Configurations of DMUX 654 and MUX 658 are controlled, via a control signal 652, by a branch selector 650. If control signal 652 is de-asserted, then a corresponding portion of sequence 646 is processed by the upper branch of bit-word converter 648. If control signal 652 is asserted, then a corresponding portion of sequence 646 is processed by the lower branch of bit-word converter 648.

In an example embodiment, branch selector 650 can generate control signal 652 based on the removed MSBs received from MSB puncher 644 as follows.

If the N MSBs removed by MSB puncher 644 from the N expanded bit-words corresponding to a data frame are all binary zeros, then branch selector 650 de-asserts control signal 652 for each of the N corresponding bit-words of sequence 646. In this situation, these bit-words are simply passed through by the upper branch of bit-word converter 648 as a corresponding portion of output data stream 102'.

If at least one the N MSBs removed by MSB puncher 644 from the N expanded bit-words corresponding to a data frame is a binary one, then the state of control signal 652 depends on the removed MSB value of the bit-word. If the MSB value removed by MSB puncher 644 from an expanded bit-word of sequence 618' is a binary "one," then branch selector 650 de-asserts control signal 652 for the corresponding bit-word of sequence 646. In this situation, the bit-word is simply passed through by the upper branch of bit-word converter 648 as a corresponding portion of output data stream 102'. In contrast, if the MSB value removed by MSB puncher 644 from an expanded bit-word of sequence 618' is a binary "zero," then branch selector 650 asserts control signal 652 for the corresponding bit-word of sequence 646. In this situation, the bit-word is processed by mapper $112_1$ and demapper $162_2$ of the lower branch of bit-word converter 648. A person of ordinary skill in the art can easily verify that the bit-word conversion performed by the lower branch of bit-word converter 648 is an inverse operation with respect to the bit-word conversion applied by shaping encoder 110 and the upper branch of shaping demapper 616 of transmitter 104 to the bit-words of input data stream 102 that have been mapped using sub-constellation $M_{2a}$. As such, the lower branch of bit-word converter 648 recovers the corresponding original bit-word of input data stream 102 and passes it on as a corresponding portion of output data stream 102'.

FIGS. 8A-8F graphically show example characteristics of the constellation shaping used in system 600 (FIG. 6) according to an embodiment. More specifically, the vertical axis in each of FIGS. 8A-8F represents the relative frequency of occurrence of different constellation symbols when input data stream 102 is a pseudo-random data sequence of a relatively large length that is sufficient for statistical analysis. The base plane in each of FIGS. 8A-8F represents the complex plane containing the constellation points that is analogous, e.g., to the complex plane of FIG. 7C.

Figure 8A:
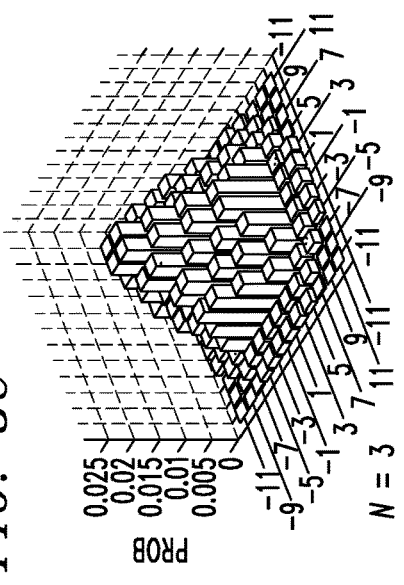
FIGS. 8A-8F graphically show example characteristics of the constellation shaping used in the communication system of FIG. 6 according to an embodiment.
Figure 8B:
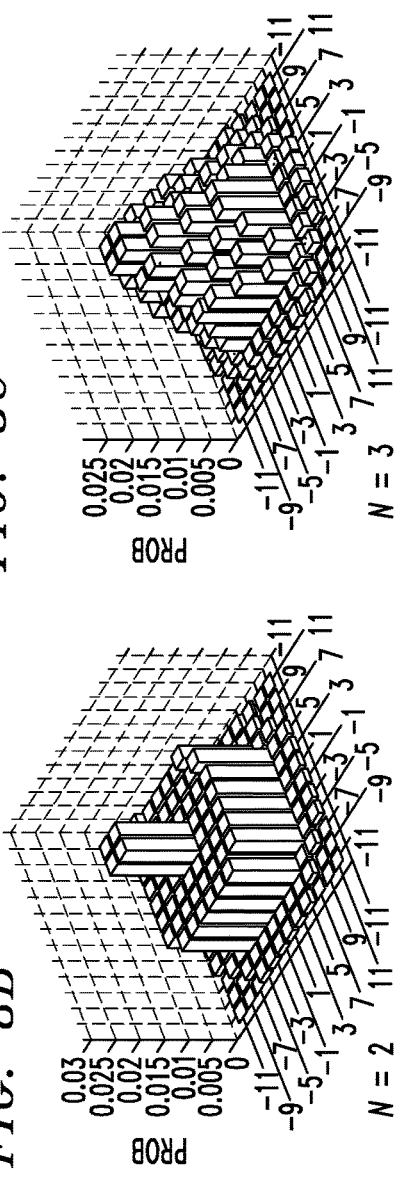
Figure 8C:
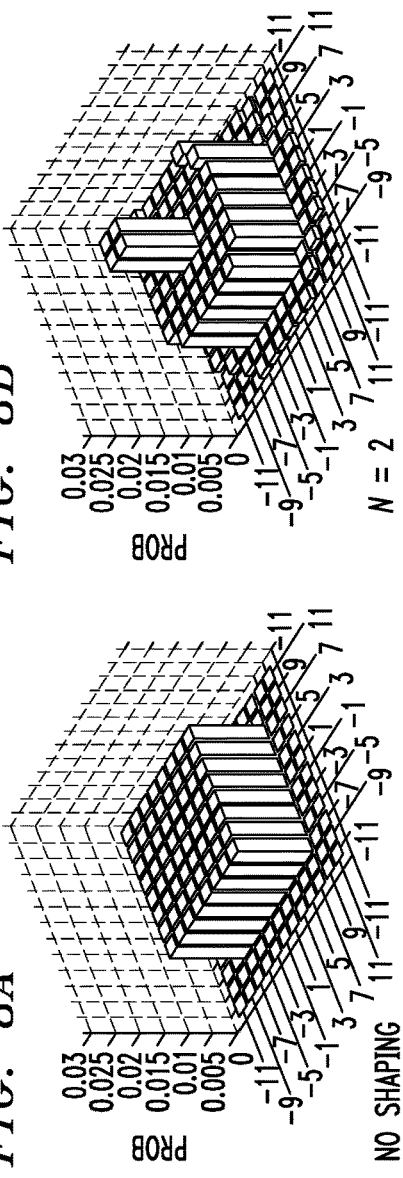
Figure 8D:
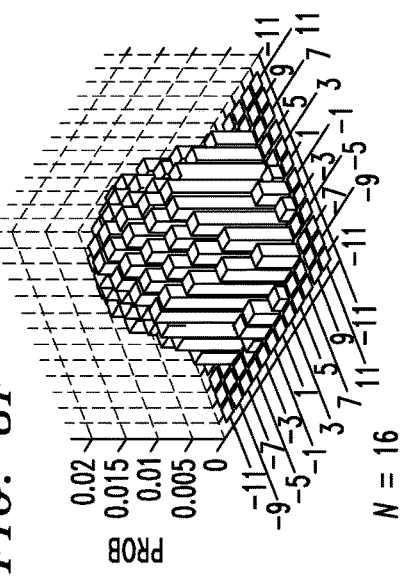
Figure 8E:
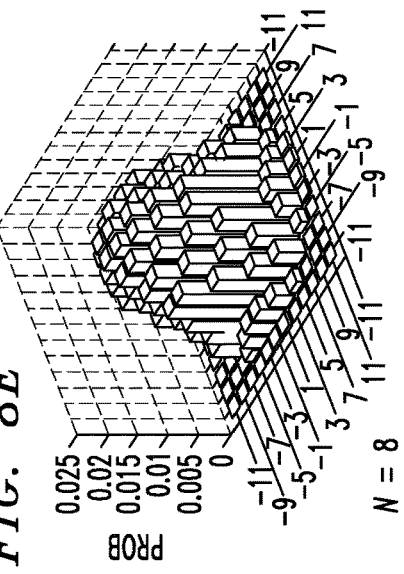
Figure 8F:
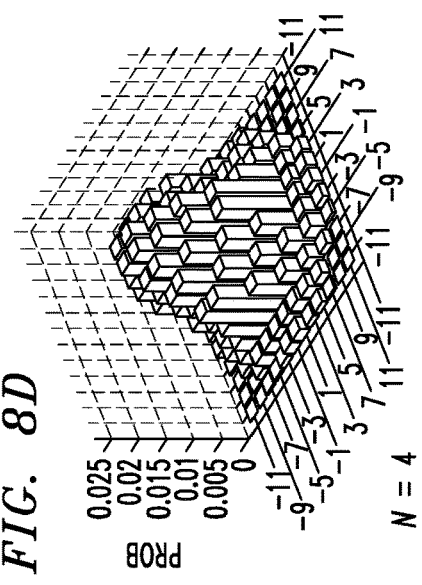

FIG. 8A shows the relative constellation-point frequency for a conventional system that does not use constellation shaping. Such a system does not have a shaping encoder at the transmitter and does not have a shaping decoder at the receiver. The operative constellation is a 64-QAM constellation. The data bars in FIG. 8A indicate that the constellation-point frequency is the same (flat) for all constellation points of the 64-QAM constellation. The constellation-point frequency is zero outside of the complex-plane area corresponding to the 64-QAM constellation. The data shown in FIG. 8A provide a reference frame for the data shown in FIGS. 8B-8F.

The data shown in FIGS. 8B-8F correspond to an embodiment in which: (i) the number of constellation points in $M_1$ is m=64; (ii) the number of constellation points in each of $M_2$ and $M_3$ is 2m=128; (iii) the bit-word length in each of $M_1$ and $M_2$ is k=6; and (iv) the expanded bit-word length in $M_3$ is (k+1)=7. The data of FIGS. 8B-8F correspond to different respective data-frame lengths N, which are shown in each of the figures. The number n of constellation symbols per data frame that is mapped using sub-constellation $M_{2b}$ is the same n=1 for each of FIGS. 8B-8F.

Inspection of the data shown in FIGS. 8B-8F reveals that the constellation shaping used in system 600 causes constellation points to occur with different respective frequencies according to which the constellation points corresponding to higher transmit energies generally occur less frequently than the constellation points corresponding to lower transmit energies. The corresponding frequency distributions can be approximated by a Gaussian function. As indicated by the data of FIGS. 8B-8F, the extent of deviation of the observed frequency distributions from the ideal Gaussian distribution depends on the frame length N and other pertinent implementation details.

Figure 9:
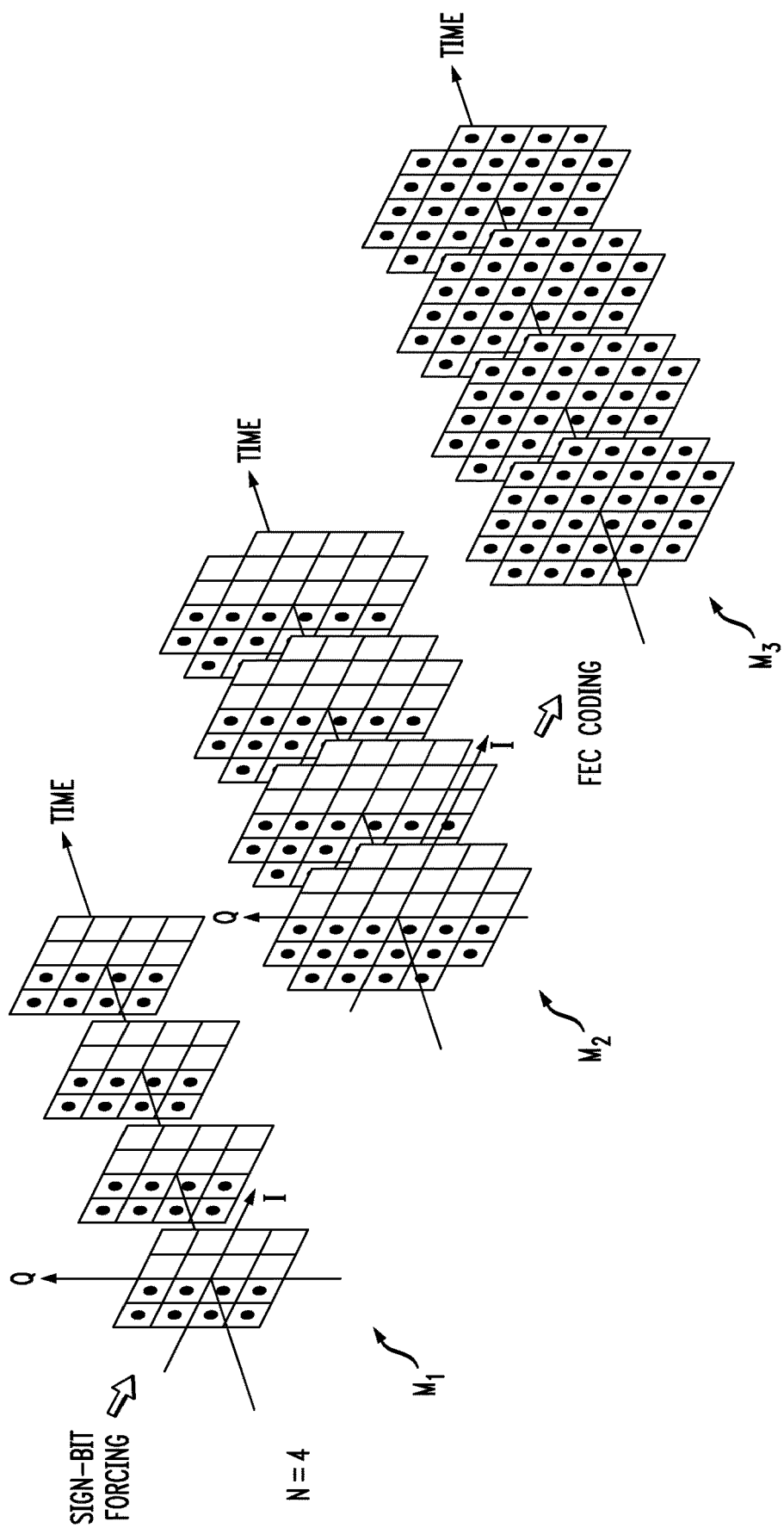
FIG. 9 graphically illustrates a method of generating data frames that can be used in the communication system of FIG. 6 according to another alternative embodiment.

FIG. 9 graphically illustrates a method 900 of generating data frames that can be used in system 600 (FIG. 6) according to another alternative embodiment. As explained below, method 900 can be used to improve (e.g., increase) the shaping gain in system 600. This improvement is achieved at the cost of having to transmit extra bits of information, e.g., in the form of sign bits.

Note that, in system 600, FEC encoder 620 is located downstream from shaping encoder 610. As a result, transmission of parity bits tends not to contribute to the shaping gain. Method 900 addresses this problem using sign bits as further detailed below.

Method 900 relies on the rotational symmetry of a QAM constellation with respect to the origin of the complex plane. To take advantage of this symmetry, binary values can be assigned to the constellation points of $M_1$ and $M_2$ such that (i) the constellation points located to the left of the Q-axis are assigned binary values whose MSB is binary "zero" and (ii) the constellation points located to the right of the Q-axis are assigned binary values whose MSB is binary "one." In the shaping encoder, each bit-word received via input data stream 102 is first prepended with an MSB whose value is forced to, e.g., binary "zero." The k least-significant bits (LSBs) of the resulting expanded bit words are then subjected to processing in the shaping encoder, e.g., as already described above, with the "zero" in the MSB position remaining unchanged. A person of ordinary skill in the art will understand that the resulting processed bit-words will all map onto the constellation points of $M_1$ and $M_2$ located to the left of the Q-axis, e.g., as indicated by the filled squares in the $M_1$ and $M_2$ data frames shown in FIG. 9.

FEC encoder 620 and constellation mapper 626 are then used to generate constellation symbols for FE module 140 as follows. If FEC encoder 620 determines that the parity bit corresponding to a constellation symbol is binary "zero," then that constellation symbol is applied by constellation mapper 626 to FE module 140 in the unchanged form. However, if FEC encoder 620 determines that the parity bit corresponding to a constellation symbol is binary "one," then that constellation symbol is first rotated by 180 degrees with respect to the origin of the complex plane and then the resulting rotated symbol is applied by constellation mapper 626 to FE module 140. This rotation causes the transmitted data frames to have constellation symbols in the second half of $M_3$ as well, e.g., as indicated by the filled squares in the $M_3$ data frame shown in FIG. 9. Since for a typical FEC code the parity bit is binary "one" with the probability of 50%, the shaped constellation symbols of $M_1$ and $M_2$ are rotated half of the time. The resulting FEC-encoded communication signal 142 is therefore properly shaped over the entire space of $M_3$ and, as such, can provide shaping gain for both information bits and parity bits.

Note that the above-described embodiment of method 900 uses the rotational symmetry of the QAM constellation with respect to a 180-degree rotation. However, the QAM constellation is also symmetric with respect to a ±90-degree rotation. As a result, two sign bits can be used to encode parity bits. To take advantage of this symmetry, binary values can be assigned to the constellation points of $M_1$ and $M_2$ such that the constellation points located in four different quadrants of the complex plane are assigned expanded bit-words of length (k+2) whose two MSBs are 00, 01, 10, and 11, respectively. The non-expanded input bit-words are shaped and mapped onto the constellation points located in a single quadrant. Depending on the binary value of the corresponding two parity bits generated by the FEC encoder, each constellation point is then rotated by 0, 90, 180, and 270 degrees to populate all quadrants of $M_3$.

A person of ordinary skill in the art will understand how to further generalize the above-described concept of sign bits used in method 900 for applying constellation shaping to both information bits and parity bits.

In some embodiments, sign bits can be used to avoid constellation expansion, due to which the size of $M_2$ is larger than the size of $M_1$. In this case, $M_2=M_{2a}$, and $M_{2b}$ is empty. The sign bit is forced to "zero" when the constellation symbol is generated using $M_1$. The sign bit is similarly forced to "one" when the constellation symbol is generated using $M_2$.

Although various embodiments are described above in reference to QAM constellations, other modulation formats, such as phase-shift keying (PSK) and pulse-amplitude modulation (PAM) can also be used.

Alternative embodiments of a data frame may include spatial-division-multiplexed (SDM) symbols, or any sets of symbols that are transmitted separately, instead of or in addition to a time series of symbols on the same dimension of the communication signal.

In some embodiments, constellation shaping can be performed multiple times in an iterative manner. For example, a first shaping encoder may be used to process the rows of an N×N symbol block, and then a second shaping encoder may be used to process the columns of that N×N symbol block.

According to an example embodiment disclosed above in reference to FIGS. 1-9, provided is an apparatus comprising: a first constellation mapper (e.g., $112_1$, FIG. 1) configured to generate a first data frame by mapping each bit-word of a first set of bit-words (e.g., received by way of 102, FIG. 1) onto a corresponding constellation symbol of a first constellation (e.g., $M_1$, FIGS. 2, 3, 7), the first frame having a first cost; a second constellation mapper (e.g., $112_1$, FIG. 1) configured to generate a second data frame by mapping each bit-word of the first set of bit-words onto a corresponding constellation symbol of a second constellation (e.g., $M_2$, FIGS. 2, 3, 7), the second frame having a second cost; and a selecting switch (e.g., 120/122/130, FIG. 1) configured to select one of the first data frame and the second data frame based on a comparison of the first cost and the second cost. The first set of bit-words has a plurality of bit-words, and each of the first and second data frames has a respective plurality of corresponding constellation symbols.

In some embodiments of the above apparatus, the first cost represents a transmit energy corresponding to the first data frame; the second cost represents a transmit energy corresponding to the second data frame; and the selecting switch is configured to select the one of the first and second data frames that has a lower transmit energy.

In some embodiments of any of the above apparatus, the selecting switch is configured to discard another one of the first and second data frames that has a higher transmit energy.

In some embodiments of any of the above apparatus, the apparatus further comprises an optical transmitter (e.g., 140, FIG. 1) operatively coupled to the selecting switch to transmit an optical communication signal (e.g., 142, FIG. 1) carrying a selected one of the first data frame and the second data frame.

In some embodiments of any of the above apparatus, the second constellation includes constellation symbols of the first constellation and a set of one or more additional constellation symbols that are not part of the first constellation.

In some embodiments of any of the above apparatus, the second constellation comprises a first sub-constellation (e.g., $M_{2a}$, FIGS. 2, 3, 7) and a second sub-constellation (e.g., $M_{2b}$, FIGS. 2, 3, 7) having no constellation symbols in common; and the second constellation mapper is configured to: assign to each constellation symbol of the first sub-constellation a respective binary value from a set of binary values; assign to each constellation symbol of the second sub-constellation a respective binary value from said set of binary values; and assign each binary value from said set of binary values to one constellation symbol of the first sub-constellation and one constellation symbol of the second sub-constellation (e.g., as shown in FIGS. 7A-7B).

In some embodiments of any of the above apparatus, the first sub-constellation includes constellation symbols of the first constellation; the first constellation mapper is configured to assign to each constellation symbol of the first constellation a respective binary value from said set of binary values; and for at least one constellation symbol that is common to the first sub-constellation and the first constellation, the first constellation mapper and the second constellation mapper are configured to assign different respective binary values from said set of binary values (e.g., as shown in FIGS. 7A-7B).

In some embodiments of any of the above apparatus, the apparatus further comprises a third constellation mapper (e.g., 626, FIG. 6) configured to generate a third data frame using a selected one of the first and second data frames, wherein the third data frame is generated using a third constellation (e.g., $M_3$, FIG. 7C).

In some embodiments of any of the above apparatus, the second constellation includes constellation symbols of the first constellation; the third constellation includes constellation symbols of the second constellation and comprises a first sub-constellation (e.g., $M_{3a}$, FIG. 7C) and a second sub-constellation (e.g., $M_{3b}$, FIG. 7C) having no constellation symbols in common; and the third constellation mapper is configured to: assign to each constellation symbol of the first sub-constellation a respective binary value derived from a binary value assigned by the first constellation mapper to a corresponding constellation symbol of the first constellation by prepending thereto a most significant bit having a first bit value (e.g., a binary zero, as indicated in FIGS. 7A and 7C); and assign to each constellation symbol of the second sub-constellation a respective binary value derived from a binary value assigned by the second constellation mapper to a corresponding constellation symbol of the second constellation by prepending thereto a most significant bit having a second bit value different from the first bit value (e.g., a binary one, as indicated in FIGS. 7B and 7C).

In some embodiments of any of the above apparatus, the apparatus further comprises: an FEC encoder (e.g., 620, FIG. 6) operatively connected between the selecting switch and the third constellation mapper; and an optical transmitter (e.g., 140, FIG. 1) operatively coupled to the third constellation mapper to transmit an optical communication signal carrying the third data frame.

In some embodiments of any of the above apparatus, the first constellation is an m-QAM constellation, where m is a positive integer greater than three; and the second constellation is a 2m-QAM constellation.

In some embodiments of any of the above apparatus, each bit-word of the first set of bit-words has k bits, where k is a positive integer, and $m=2^k$.

In some embodiments of any of the above apparatus, each bit-word of the first set of bit-words has k bits, where k is a positive integer, and $m=2^{k+1}$.

In some embodiments of any of the above apparatus, the first constellation mapper is further configured to generate the first data frame by mapping the bit-words of the first set of bit-words only onto a subset of constellation symbols of the first constellation corresponding to one half of a complex plane; and the second constellation mapper is further configured to generate the second data frame by mapping the bit-words of the first set of bit-words only onto a subset of constellation symbols of the second constellation corresponding to said one half of the complex plane.

In some embodiments of any of the above apparatus, the apparatus further comprises: an FEC encoder (e.g., 620, FIG. 6) configured to generate a set of parity bits corresponding to the first set of bit-words; and a third constellation mapper (e.g., 626, FIG. 6) configured to: generate a third data frame using a selected one of the first and second data frames; and encode each of the parity bits using a most significant bit of a binary value assigned to a respective constellation symbol of the third constellation (e.g., $M_3$, FIG. 9).

In some embodiments of any of the above apparatus, the third constellation is a 2m-QAM constellation. The FEC encoder and the third constellation mapper are further configured to cause the third data frame to have constellation symbols of the third constellation corresponding to both halves of the complex plane.

In some embodiments of any of the above apparatus, each bit-word of the first set of bit-words has k bits, where k is a positive integer, and $m=2^{k+2}$.

In some embodiments of any of the above apparatus, the first constellation mapper is further configured to generate the first data frame by mapping the bit-words of the first set of bit-words only onto a subset of constellation symbols of the first constellation corresponding to a single quadrant of a complex plane; and the second constellation mapper is further configured to generate the second data frame by mapping the bit-words of the first set of bit-words only onto a subset of constellation symbols of the second constellation corresponding to said single quadrant of the complex plane.

In some embodiments of any of the above apparatus, the apparatus further comprises: an FEC encoder configured to generate a set of parity bits corresponding to the first set of bit-words; and a third constellation mapper configured to: generate a third data frame using a selected one of the first and second data frames; and encode each pair of the parity bits using two most significant bits of a binary value assigned to a respective constellation symbol of the third constellation.

In some embodiments of any of the above apparatus, the third constellation is a 2m-QAM constellation. The FEC encoder and the third constellation mapper are further configured to cause the third data frame to have constellation symbols of the third constellation corresponding to all four quadrants of the complex plane.

According to another example embodiment disclosed above in reference to FIGS. 1-9, provided is an apparatus comprising: a first constellation mapper (e.g., 112₁, FIG. 1) configured to generate a first data frame (e.g., 112₁, FIG. 1) by mapping each bit-word of a first set of bit-words (e.g., received by way of 102, FIG. 1) onto a corresponding constellation symbol of a first constellation (e.g., $M_1$, FIGS. 2, 3, 7); a second constellation mapper (e.g., 112₂, FIG. 1) configured to generate a second data frame (e.g., 112₂, FIG. 1) by mapping each bit-word of the first set of bit-words onto a corresponding constellation symbol of a second constellation (e.g., $M_2$, FIGS. 2, 3, 7); and means for selecting (e.g., 120/122/130, FIG. 1) one of the first data frame and the second data frame, the means for selecting being responsive to a cost of the first data frame and a cost of the second data frame.

In some embodiments of the above apparatus, the cost of the first data frame is a transmit energy corresponding to the first data frame; the cost of the second data frame is a transmit energy corresponding to the second data frame; and the means for selecting is configured to select the one of the first and second data frames that has a lower transmit energy.

In some embodiments of any of the above apparatus, the means for selecting is configured to discard another one of the first and second data frames that has a higher transmit energy.

In some embodiments of any of the above apparatus, the apparatus further comprises a transmitter (e.g., 140, FIG. 1) operatively coupled to the means for selecting to transmit over a communication channel (e.g., 106, FIG. 1) a communication signal (e.g., 142, FIG. 1) carrying a selected one of the first data frame and the second data frame.

In some embodiments of any of the above apparatus, the transmitter comprises an optical transmitter; and the communication channel is established over an optical fiber or fiber-optic cable.

In some embodiments of any of the above apparatus, the second constellation comprises a first sub-constellation (e.g., $M_{2a}$, FIGS. 2, 3, 7) and a second sub-constellation (e.g., $M_{2b}$, FIGS. 2, 3, 7) having no constellation symbols in common; each constellation symbol of the first sub-constellation has assigned thereto a respective binary value from a set of binary values (e.g., as shown in FIG. 7B); each constellation symbol of the second sub-constellation has assigned thereto a respective binary value from said set of binary values (e.g., as shown in FIG. 7B); and each binary value from said set of binary values is assigned to exactly one constellation symbol of the first sub-constellation and exactly one constellation symbol of the second sub-constellation.

In some embodiments of any of the above apparatus, if the binary values of said set of binary values are arranged to form an ordered set of binary values in an ascending order of symbol cost with respect to the constellation symbols of the first sub-constellation, then the binary values of the ordered set also have a descending order of symbol cost with respect to the constellation symbols of the second sub-constellation (e.g., as indicated by 204 and 206, FIG. 2).

In some embodiments of any of the above apparatus, each constellation symbol of the first constellation has assigned thereto a respective binary value from said set of binary values (e.g., as shown in FIG. 7A); and the binary values of the ordered set also have an ascending order of symbol cost with respect to the constellation symbols of the first constellation (e.g., as indicated by 202, FIG. 2).

In some embodiments of any of the above apparatus, the apparatus further comprises a third constellation mapper (e.g., 626, FIG. 6) configured to generate a third data frame using a selected one of the first and second data frames, wherein the third data frame is generated using a third constellation (e.g., $M_3$, FIG. 7C).

In some embodiments of any of the above apparatus, each constellation symbol of the first constellation has assigned thereto a respective binary value from said set of binary values, with each binary value from said set of binary values assigned to exactly one constellation symbol of the first constellation (e.g., as shown in FIG. 7A); the third constellation comprises a third sub-constellation (e.g., $M_{3a}$, FIG. 7C) and a fourth sub-constellation (e.g., $M_{3b}$, FIG. 7C) having no constellation symbols in common; each constellation symbol of the third sub-constellation has assigned thereto a respective binary value derived from a binary value assigned to a corresponding constellation symbol of the first constellation by prepending thereto a most significant bit having a first bit value (e.g., a binary zero, as indicated in FIGS. 7A and 7C); and each constellation symbol of the fourth sub-constellation has assigned thereto a respective binary value derived from a binary value assigned to a corresponding constellation symbol of the second sub-constellation by prepending thereto a most significant bit having a second bit value (e.g., a binary one, as indicated in FIGS. 7B and 7C).

In some embodiments of any of the above apparatus, the apparatus further comprises: an FEC encoder (e.g., 620, FIG. 6) operatively connected between the means for selecting and the third constellation mapper; and a transmitter (e.g., 140, FIG. 1) operatively coupled to the third constellation mapper to transmit over a communication channel (e.g., 106, FIG. 1) a communication signal carrying the third data frame.

In some embodiments of any of the above apparatus, the first constellation is an m-QAM constellation (e.g., $M_1$, FIG. 7A), where m is a positive integer greater than three; and the second constellation is a 2m-QAM constellation (e.g., $M_2$, FIG. 7B).

In some embodiments of any of the above apparatus, each bit-word of the first set of bit-words has k bits, where k is a positive integer, and $m=2^k$.

In some embodiments of any of the above apparatus, each bit-word of the first set of bit-words has k bits, where k is a positive integer, and $m=2^{k+1}$.

In some embodiments of any of the above apparatus, the first constellation mapper is further configured to generate the first data frame by mapping the bit-words of the first set of bit-words only onto a subset of constellation symbols of the first constellation corresponding to one half of a complex plane (e.g., as indicated for $M_1$ in FIG. 9); and the second constellation mapper is further configured to generate the second data frame by mapping the bit-words of the first set of bit-words only onto a subset of constellation symbols of the second constellation corresponding to said one half of the complex plane (e.g., as indicated for $M_2$ in FIG. 9).

In some embodiments of any of the above apparatus, the apparatus further comprises: an FEC encoder (e.g., 620, FIG. 6) configured to generate a set of parity bits corresponding to the first set of bit-words; and a third constellation mapper (e.g., 626, FIG. 6) configured to generate a third data frame using a selected one of the first and second data frames, wherein the third data frame is generated using a third constellation (e.g., $M_3$, FIG. 9) in a manner that causes each of the parity bits to be encoded using a most significant bit of a binary value assigned to a respective constellation symbol of the third constellation.

In some embodiments of any of the above apparatus, the third constellation is a 2m-QAM constellation (e.g., $M_3$, FIG. 9); and the FEC encoder and the third constellation mapper are further configured to cause the third data frame to have constellation symbols of the third constellation corresponding to both halves of the complex plane.

In some embodiments of any of the above apparatus, each bit-word of the first set of bit-words has k bits, where k is a positive integer, and $m=2^{k+2}$.

In some embodiments of any of the above apparatus, the first constellation mapper is further configured to generate the first data frame by mapping the bit-words of the first set of bit-words only onto a subset of constellation symbols of the first constellation corresponding to a single quadrant of a complex plane; and the second constellation mapper is further configured to generate the second data frame by mapping the bit-words of the first set of bit-words only onto a subset of constellation symbols of the second constellation corresponding to said single quadrant of the complex plane.

In some embodiments of any of the above apparatus, the apparatus further comprises: an FEC encoder (e.g., 620, FIG. 6) configured to generate a set of parity bits corresponding to the first set of bit-words; and a third constellation mapper (e.g., 626, FIG. 6) configured to generate a third data frame using a selected one of the first and second data frames, wherein the third data frame is generated using a third constellation (e.g., $M_3$, FIG. 9) in a manner that causes each pair of the parity bits to be encoded using two most significant bits of a binary value assigned to a respective constellation symbol of the third constellation.

In some embodiments of any of the above apparatus, the third constellation is a 2m-QAM constellation (e.g., $M_3$, FIG. 9); and the FEC encoder and the third constellation mapper are further configured to cause the third data frame to have constellation symbols of the third constellation corresponding to all four quadrants of the complex plane.

While this disclosure includes references to illustrative embodiments, this specification is not intended to be construed in a limiting sense. Various modifications of the described embodiments, as well as other embodiments within the scope of the disclosure, which are apparent to persons skilled in the art to which the disclosure pertains are deemed to lie within the principle and scope of the disclosure, e.g., as expressed in the following claims.

As used herein, the terms "assert" and "de-assert" are used when referring to the rendering of a control signal, status bit, or other relevant functional feature or element into its logically true and logically false state, respectively. If the logically true state is a logic level one, then the logically false state is a logic level zero. Alternatively, if the logically true state is logic level zero, then the logically false state is logic level one.

In various alternative embodiments, each logic signal described herein may be generated using positive or negative logic circuitry. For example, in the case of a negative logic signal, the signal is active low, and the logically true state corresponds to a logic level zero. Alternatively, in the case of a positive logic signal, the signal is active high, and the logically true state corresponds to a logic level one.

Unless explicitly stated otherwise, each numerical value and range should be interpreted as being approximate as if the word "about" or "approximately" preceded the value or range.

It will be further understood that various changes in the details, materials, and arrangements of the parts which have been described and illustrated in order to explain the nature of this disclosure may be made by those skilled in the art without departing from the scope of the disclosure, e.g., as expressed in the following claims.

Although the elements in the following method claims, if any, are recited in a particular sequence with corresponding labeling, unless the claim recitations otherwise imply a particular sequence for implementing some or all of those elements, those elements are not necessarily intended to be limited to being implemented in that particular sequence.

Reference herein to "one embodiment" or "an embodiment" means that a particular feature, structure, or characteristic described in connection with the embodiment can be included in at least one embodiment of the disclosure. The appearances of the phrase "in one embodiment" in various places in the specification are not necessarily all referring to the same embodiment, nor are separate or alternative embodiments necessarily mutually exclusive of other embodiments. The same applies to the term "implementation."

Also for purposes of this description, the terms "couple," "coupling," "coupled," "connect," "connecting," or "connected" refer to any manner known in the art or later developed in which energy is allowed to be transferred between two or more elements, and the interposition of one or more additional elements is contemplated, although not required. Conversely, the terms "directly coupled," "directly connected," etc., imply the absence of such additional elements.

The described embodiments are to be considered in all respects as only illustrative and not restrictive. In particular, the scope of the disclosure is indicated by the appended claims rather than by the description and figures herein. All changes that come within the meaning and range of equivalency of the claims are to be embraced within their scope.

The description and drawings merely illustrate the principles of the disclosure. It will thus be appreciated that those of ordinary skill in the art will be able to devise various arrangements that, although not explicitly described or shown herein, embody the principles of the disclosure and are included within its spirit and scope. Furthermore, all examples recited herein are principally intended expressly to be only for pedagogical purposes to aid the reader in understanding the principles of the disclosure and the concepts contributed by the inventor(s) to furthering the art, and are to be construed as being without limitation to such specifically recited examples and conditions. Moreover, all statements herein reciting principles, aspects, and embodiments of the disclosure, as well as specific examples thereof, are intended to encompass equivalents thereof.

The functions of the various elements shown in the figures, including any functional blocks labeled as "processors" and/or "controllers," may be provided through the use of dedicated hardware as well as hardware capable of executing software in association with appropriate software. Some circuit elements may be implemented using, without limitation, digital signal processor (DSP) hardware, an application specific integrated circuit (ASIC), a field programmable gate array (FPGA), a read only memory (ROM) for storing software, a random access memory (RAM), and non-volatile storage. Other hardware, conventional and/or custom, may also be included.

It should be appreciated by those of ordinary skill in the art that any block diagrams herein represent conceptual views of illustrative circuitry embodying the principles of the disclosure. Similarly, it will be appreciated that any flow charts, flow diagrams, state transition diagrams, pseudo code, and the like represent various processes which may be substantially represented in computer readable medium and so executed by a computer or processor, whether or not such computer or processor is explicitly shown.

What is claimed is:

1. An apparatus comprising:
   a shaping encoder that comprises first and second constellation mappers and a selector switch, the first constellation mapper being configured to generate a first data frame by mapping each bit-word of a first set of bit-words onto a corresponding constellation symbol of a first constellation, the first data frame having a first cost defined by energies of the constellation symbols of the first data frame, the second constellation mapper being configured to generate a second data frame by mapping each bit-word of the first set of bit-words onto a corresponding constellation symbol of a second constellation, the second frame having a second cost defined by energies of the constellation symbols of the second data frame, the selector switch being configured to select one of the first data frame and the second data frame based on a comparison of the first cost and the second cost; and
   an optical transmitter coupled to the selector switch to transmit an optical communication signal carrying the selected one of the first data frame and the second data frame.

2. The apparatus of claim 1, wherein the selector switch is configured to:
   select the first data frame if the first cost is smaller than the second cost; and select the second data frame if the second cost is smaller than the first cost.

3. The apparatus of claim 2, wherein the selector switch is configured to discard a remaining one of the first and second data frames.

4. The apparatus of claim 1, wherein the second constellation includes constellation symbols of the first constellation and a set of one or more additional constellation symbols that are not part of the first constellation.

5. The apparatus of claim 1, wherein:
the second constellation comprises a first sub-constellation and a second sub-constellation having no constellation symbols in common; and
the second constellation mapper is configured to:
assign to each constellation symbol of the first sub-constellation a respective binary value from a set of binary values;
assign to each constellation symbol of the second sub-constellation a respective binary value from said set of binary values; and
assign each binary value from said set of binary values to one constellation symbol of the first sub-constellation and one constellation symbol of the second sub-constellation.

6. The apparatus of claim 5, wherein:
the first sub-constellation includes constellation symbols of the first constellation;
the first constellation mapper is configured assign to each constellation symbol of the first constellation a respective binary value from said set of binary values; and
for at least one constellation symbol that is common to the first sub-constellation and the first constellation, the first constellation mapper and the second constellation mapper are configured to assign different respective binary values from said set of binary values.

7. The apparatus of claim 1, wherein:
the first constellation is an m-QAM constellation, where m is a positive integer greater than three; and
the second constellation is a 2m-QAM constellation.

8. The apparatus of claim 7, wherein each bit-word of the first set of bit-words has k bits, where k is a positive integer, and $m=2^k$.

9. The apparatus of claim 7, wherein each bit-word of the first set of bit-words has k bits, where k is a positive integer, and $m=2^{k+1}$.

10. The apparatus of claim 9, wherein:
the first constellation mapper is further configured to generate the first data frame by mapping the bit-words of the first set of bit-words only onto a subset of constellation symbols of the first constellation corresponding to one half of a complex plane; and
the second constellation mapper is further configured to generate the second data frame by mapping the bit-words of the first set of bit-words only onto a subset of constellation symbols of the second constellation corresponding to said one half of the complex plane.

11. The apparatus of claim 10, further comprising:
an FEC encoder configured to generate a set of parity bits corresponding to the first set of bit- words; and
a third constellation mapper configured to:
generate a third data frame using a selected one of the first and second data frames; and
encode each of the parity bits using a most significant bit of a binary value assigned to a respective constellation symbol of a third constellation.

12. The apparatus of claim 11,
wherein the third constellation is a 2m-QAM constellation; and
wherein the FEC encoder and the third constellation mapper are further configured to cause the third data frame to have constellation symbols of the third constellation corresponding to both halves of the complex plane.

13. The apparatus of claim 7, wherein each bit-word of the first set of bit-words has k bits, where k is a positive integer, and $m=2^{k+2}$.

14. The apparatus of claim 13, wherein:
the first constellation mapper is further configured to generate the first data frame by mapping the bit-words of the first set of bit-words only onto a subset of constellation symbols of the first constellation corresponding to a single quadrant of a complex plane; and
the second constellation mapper is further configured to generate the second data frame by mapping the bit-words of the first set of bit-words only onto a subset of constellation symbols of the second constellation corresponding to said single quadrant of the complex plane.

15. The apparatus of claim 14, further comprising:
an FEC encoder configured to generate a set of parity bits corresponding to the first set of bit- words; and
a third constellation mapper configured to:
generate a third data frame using a selected one of the first and second data frames; and
encode each pair of the parity bits using two most significant bits of a binary value assigned to a respective constellation symbol of a third constellation.

16. The apparatus of claim 15,
wherein the third constellation is a 2m-QAM constellation; and
wherein the FEC encoder and the third constellation mapper are further configured to cause the third data frame to have constellation symbols of the third constellation corresponding to all four quadrants of the complex plane.

17. The apparatus of claim 1,
wherein each of the first and second data frames has a fixed number of constellation symbols, the fixed number being a positive integer greater than one;
wherein the first cost is a sum of transmit energies of the fixed number of constellation symbols of the first frame; and
wherein the second cost is a sum of transmit energies of the fixed number of constellation symbols of the second frame.

18. The apparatus of claim 1,
wherein each of the first and second data frames has a fixed number of constellation symbols, the fixed number being a positive integer greater than one;
wherein the first cost is a variance of transmit energy of the fixed number of constellation symbols of the first frame; and
wherein the second cost is a variance of transmit energy of the fixed number of constellation symbols of the second frame.

19. The apparatus of claim 1,
wherein each of the first and second data frames has a fixed number of constellation symbols, the fixed number being a positive integer greater than one;
wherein the first cost is a weighted sum of (i) a variance of transmit energy of the fixed number of constellation symbols of the first frame and (ii) a sum of transmit energies of the fixed number of constellation symbols of the first frame; and wherein the second cost is a weighted sum of (i) a variance of transmit energy of the fixed number of constellation symbols of the second frame and (ii) a sum of transmit energies of the fixed number of constellation symbols of the second frame.

20. The apparatus of claim 1, further comprising a third constellation mapper configured to generate a third data frame using a selected one of the first and second data frames, wherein the third data frame is generated using a third constellation.

21. The apparatus of claim 20, wherein:
the second constellation includes constellation symbols of the first constellation;
the third constellation includes constellation symbols of the second constellation and comprises a first sub-constellation and a second sub-constellation having no constellation symbols in common; and
the third constellation mapper is configured to:
assign to each constellation symbol of the first sub-constellation a respective binary value derived from a binary value assigned by the first constellation mapper to a corresponding constellation symbol of the first constellation by prepending thereto a most significant bit having a first bit value; and
assign to each constellation symbol of the second sub-constellation a respective binary value derived from a binary value assigned by the second constellation mapper to a corresponding constellation symbol of the second constellation by prepending thereto a most significant bit having a second bit value different from the first bit value.

22. The apparatus of claim 20, further comprising:
an FEC encoder connected between the selector switch and the third constellation mapper; and
wherein the optical transmitter is coupled to the third constellation mapper to transmit an optical communication signal carrying the third data frame.

* * * * *